(12) United States Patent
Kobayashi

(10) Patent No.: US 10,334,169 B2
(45) Date of Patent: Jun. 25, 2019

(54) DISPLAY SYSTEM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/213,939

(22) Filed: Jul. 19, 2016

(65) Prior Publication Data

US 2017/0041544 A1 Feb. 9, 2017

(30) Foreign Application Priority Data

Aug. 3, 2015 (JP) .................................. 2015-153170

(51) Int. Cl.
*H04N 5/232* (2006.01)
*G06F 3/01* (2006.01)
*G02B 27/01* (2006.01)

(52) U.S. Cl.
CPC ....... *H04N 5/23267* (2013.01); *G02B 27/017* (2013.01); *G06F 3/011* (2013.01); *H04N 5/23258* (2013.01); *G02B 2027/014* (2013.01); *G02B 2027/0138* (2013.01); *G02B 2027/0141* (2013.01)

(58) Field of Classification Search
CPC .................... H04N 5/23248; H04N 5/23261
USPC ...................................................... 348/208.3
See application file for complete search history.

(56) References Cited

U.S. PATENT DOCUMENTS

| | | | | |
|---|---|---|---|---|
| 7,483,055 B2* | 1/2009 | Moriya | .................. | G03B 17/00 348/208.3 |
| 7,880,769 B2* | 2/2011 | Qi | .......................... | H04N 5/145 348/208.1 |
| 8,493,454 B1* | 7/2013 | Kohn | .................. | H04N 5/23258 348/208.2 |
| 2011/0273571 A1* | 11/2011 | Shimada | ............ | G06K 9/00261 348/207.99 |
| 2012/0127329 A1* | 5/2012 | Voss | .................... | H04N 5/23219 348/208.4 |
| 2012/0320224 A1 | 12/2012 | Miyoshi et al. | | |
| 2013/0278497 A1 | 10/2013 | Takagi et al. | | |
| 2014/0313354 A1* | 10/2014 | Kusanagi | ........... | H04N 5/23267 348/208.6 |
| 2015/0022677 A1* | 1/2015 | Guo | .................... | H04N 5/23267 348/208.1 |

(Continued)

FOREIGN PATENT DOCUMENTS

| | | |
|---|---|---|
| JP | 2002-229089 A | 8/2002 |
| JP | 2012-023768 A | 2/2012 |

(Continued)

*Primary Examiner* — Anthony J Daniels
(74) *Attorney, Agent, or Firm* — Oliff PLC

(57) ABSTRACT

When a movement of an image pickup section detected by a sensor satisfies a predetermined condition, a data processing section sets, in a reference cutout position set in advance, a specified position of a cutout region for cutting out an image and generates the image data for display. When the movement does not satisfy the predetermined condition, the data processing section shifts the specified position from the reference cutout position in a direction opposite to the movement of the image pickup section from a reference position and generates the image data for display.

12 Claims, 19 Drawing Sheets

(56) References Cited

U.S. PATENT DOCUMENTS

| | | | | |
|---|---|---|---|---|
| 2015/0036006 A1* | 2/2015 | Xu | ................ | H04N 5/23267 |
| | | | | 348/208.1 |
| 2016/0086306 A1* | 3/2016 | Nishimaki | ................ | G06T 3/40 |
| | | | | 345/620 |
| 2016/0323567 A1* | 11/2016 | Matson | ................ | G02B 27/0172 |
| 2017/0263056 A1* | 9/2017 | Leppanen | ................ | G06F 3/04895 |

FOREIGN PATENT DOCUMENTS

| | | |
|---|---|---|
| JP | 2012-160898 A | 8/2012 |
| JP | 2013-005101 A | 1/2013 |
| JP | 2013-225042 A | 10/2013 |
| JP | 2015-019274 A | 1/2015 |
| WO | 2012/105499 A1 | 8/2012 |
| WO | 2015/004916 A1 | 1/2015 |

* cited by examiner

OBJECT-OF-ATTENTION TABLE 122

| TARGET OBJECT OF ATTENTION | CHARACTERISTIC DATA |
|---|---|
| DISPLAY | |
| PAPER FEEDING SLOT | |
| ⋮ | ⋮ |
| DISCHARGE SECTION | |
| SPINDLE BEARING | |

DISPLAY SYSTEM

BACKGROUND

1. Technical Field

The present invention relates to a display system.

2. Related Art

As a technique of a display system, there is known a technique for photographing and displaying an image (e.g., JP-A-2012-160898 (Patent Literature 1) and JP-A-2012-023768 (Patent Literature 2)).

Patent Literature 1 discloses a remote support system including a head mounted display mounted on the head of an operator and a display device. The remote support system causes a remote monitor device to display an image of a target object picked up by a camera included in the head mounted display. In the technique of Patent Literature 1, in order to suppress a tilt of the target object displayed on the display device even when the operator tilts the neck, tilt correction is performed on picked-up image data.

In the technique of Patent Literature 2, when it is determined that an image pickup device is moving at acceleration exceeding a threshold, a frame rate of an image pickup section of the image pickup device is reduced.

When a photographer causes a display device located in a place different from an image pickup section to display a moving image, because of an unintended movement of the photographer, a moving image is sometimes displayed on the display device as if shaking. In this case, as illustrated below, various deficiencies could occur because the moving image is displayed as if shaking. For example, there is a deficiency in that a person viewing the moving image displayed on the display device has visually induced motion sickness. For example, there is a deficiency in that the target object in the moving image displayed on the display device cannot be accurately grasped.

On the other hand, it is conceivable to detect a shake of the image pickup section, correct moving image data to cancel the detected shake, and cause the display device to display the moving image data to reduce the occurrence of the deficiencies. However, when the moving image data is corrected to cancel the detected shake, a moving image is corrected even when the photographer intentionally moves the image pickup section. Therefore, a moving image different from a moving image that the photographer actually desires to acquire is displayed on the display device.

Besides, in the display system, there are demands for a reduction in size, a reduction in costs, power saving, facilitation of manufacturing, improvement of convenience of use, and the like.

SUMMARY

An advantage of some aspects of the invention is to solve at least apart of the problems described above, and the invention can be implemented as the following aspects.

(1) According to an aspect of the invention, a display system is provided. The display system includes: an image pickup section configured to pick up an image; a sensor for detecting a movement of the image pickup section; a data processing section configured to cut out a predetermined cutout region of the image and generate image data for display; and a data transmitting section configured to transmit the image data for display to a display device. When the movement of the image pickup section detected by the sensor satisfies a predetermined condition, the data processing section sets, in a reference cutout position set in advance, a specified position of the cutout region for cutting out the image and generates the image data for display. When the movement does not satisfy the predetermined condition, the data processing section shifts the specified position from the reference cutout position in a direction opposite to the movement of the image pickup section from a reference position and generates the image data for display. According to this aspect, it is possible to, while causing the display device to display a moving image including a target object, reduce a shake of an image displayed on the display device due to the movement of the image pickup section that does not satisfy the predetermined condition. Note that, in this specification, a form of the data processing section cutting out an image includes a form of reading out data used as the image data for display from image data.

(2) In the display system according to the aspect, the predetermined condition may be a condition that a moving amount of the image pickup section from the reference position is continuously equal to or larger than a predetermined threshold for a predetermined time or more. According to this aspect, a movement of the image pickup section equal to or larger than the predetermined threshold, which occurs in a time period shorter than the predetermined time, is not reflected on the image displayed on the display device. Therefore, it is possible to further reduce the shake of the image displayed on the display device.

(3) In the display system according to the aspect, the data processing section may include an interpolation processing section configured to generate, when a second image represented by a second version of the image data for display generated when the predetermined condition is satisfied is displayed on the display device after a first image represented by a first version of the image data for display generated when the predetermined condition is not satisfied, image data for interpolation display for interpolating a difference between the first image and the second image, and the interpolation processing section may insert the image data for interpolation display between the first and second versions of image data for display arranged in time series. According to this aspect, an interpolation image is inserted between the first image and the second image arranged in time series and is displayed on the display device. Therefore, it is possible to suppress content of the image displayed on the display device from being suddenly switched.

(4) In the display system according to the aspect, the data processing section may be capable of curtailing a plurality of images picked up by the image pickup section and generated at a first frame rate and causing the data transmitting section to transmit the image data for display at a second frame rate lower than the first frame rate, and the interpolation processing section may select image data for interpolation serving as the image data located between the image data serving as a base of the first version of image data for display and the image data serving as a base of the second version of image data for display and scheduled to be curtailed at the second frame rate, cut out an image represented by the image data for interpolation in the cutout region centering on the reference cutout position, and generate the image data for interpolation display. According to this aspect, it is possible to generate the image data for interpolation display effectively using an image scheduled to be curtailed at the second frame rate.

(5) The display system according to the aspect, the interpolation processing section may set, with respect to the image data serving as a base of at least a singularity of the image data for display located, in time series, between a first version of the image data serving as a base of the first version of image data for display and a second version of the image data serving as a base of the second version of image data for display, the specified position to interpolate the movement of the image pickup section from the generation of the first version of image data to the generation of the second version of image data and generate the image data for interpolation display. According to this aspect, it is possible to generate the image data for interpolation display using the image data serving as a base of the image data for display.

(6) In the display system according to the aspect, the data processing section may further include a cutout-position setting section configured to set the reference cutout position on the basis of a region of attention that should be paid attention. According to this aspect, it is possible to easily set the reference cutout position on the basis of the region of attention.

(7) In the display system according to the aspect, the cutout-position setting section may set the reference cutout position using, as the region of attention, overlapping image regions among a plurality of the images picked up by the image pickup section in a predetermined period. According to this aspect, it is possible to easily set the region of attention on the basis of the overlapping image regions.

(8) In the display system according to the aspect, the cutout-position setting section may set the reference cutout position using, as the region of attention, a region including a designated target object designated from the outside. According to this aspect, it is possible to set, as the region of attention, the region including the designated target object designated from the outside.

(9) In the display system according to the aspect, the display system may further include an image display section configured to cause a user of the image pickup section to visually recognize the designated target object. According to this aspect, the user can visually recognize the designated target object on the image display section.

(10) In the display system according to the aspect, the display system may further include a storing section configured to store characteristic information for detecting a target object of attention, and, when the target object of attention is detected in the image represented by the image data using the characteristic information, the cutout-position setting section may determine, as the region of attention, a region including the target object of attention and set the reference cutout position. According to this aspect, it is possible to set the reference cutout position by automatically detecting the target object of attention with the cutout-position setting section.

(11) In the display system according to the aspect, the cutout-position setting section may set a specified position of the region of attention as the reference cutout position. According to this aspect, it is possible to surely locate the target object of attention within a cutout region centering on the reference cutout position.

(12) In the display system according to the aspect, the display system may further include a distance detecting section configured to detect a distance between the image pickup section and a predetermined target object included in the image, and the data processing section may further include a cutout-region setting section configured to change a size of the cutout region according to the distance detected by the distance detecting section. According to the aspect, it is possible to change the size of the cutout region according to the distance detected by the distance detecting section.

(13) In the display system according to the aspect, the data processing section may set the cutout region larger as the distance is larger. According to this aspect, it is possible to suppress the size of the target object displayed on a display section from greatly fluctuating.

(14) In the display system according to the aspect, the distance detecting section may detect the distance by comparing an actual size of the predetermined target object and a size of the predetermined target object in the image. According to this aspect, it is possible to compare the size of the predetermined target object and the size of the predetermined target object in the image and detect the distance.

(15) In the display system according to the aspect, the same identification information may be given to each of image data representing the image and detection information of the sensor at the time when the image data is generated. According to this aspect, it is possible to easily associate the image data and the detection information.

(16) In the display system according to the aspect, the display system may further include an information processing device configured to acquire the image photographed by the image pickup section, and the data processing section may be provided in the information processing device. With the display system according to this aspect, it is possible to implement the functions of the data processing section in a server.

(17) In the display system according to the aspect, the display system may further include an image display device including a display section configured to display a virtual image and capable of transmitting an outside world, and the data processing section may be provided in the image display device. According to this aspect, it is possible to implement the functions of the data processing section in the image display device.

(18) In the display system according to the aspect, the display system may further include a display device configured to display an image for display represented by the image data for display, and the data processing section may be provided in the display device. According to this aspect, it is possible to implement the functions of the data processing section in the display device.

Not all of the plurality of components included in the aspects of the invention explained above are essential. In order to solve apart or all of the problems explained above or achieve a part of all of the effects described in this specification, concerning apart of the plurality of components, it is possible to appropriately perform a change, deletion, replacement of the components with new components, and deletion of a part of limitation contents. In order to solve a part or all of the problems explained above or in order to achieve a part or all of the effects described in this specification, it is also possible to combine a part or all of the technical features included in one aspect of the invention explained above with a part or all of the technical features included in the other aspects of the invention to form an independent one aspect of the invention.

For example, one aspect of the invention can be implemented as an apparatus including a part or all of the four components, that is, the image pickup section, the sensor, the data processing section, and the data transmitting section. That is, the apparatus may include or may not include the image pickup section. The apparatus may or may not include the sensor. The apparatus may or may not include the data processing section. The apparatus may or may not include the data transmitting section. Such an apparatus can be implemented as, for example, a display system but can also be implemented as systems other than the display system. A part or all of the technical features of the aspects of the display system explained above can be applied to the apparatus.

The invention can be implemented in various forms. For example, the invention can be implemented in forms such as a display system, a method of controlling the display system, an image display system including a head-mounted display device, a computer program for implementing functions of the display system, and a storage medium having stored therein the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Display System

Figure 1:
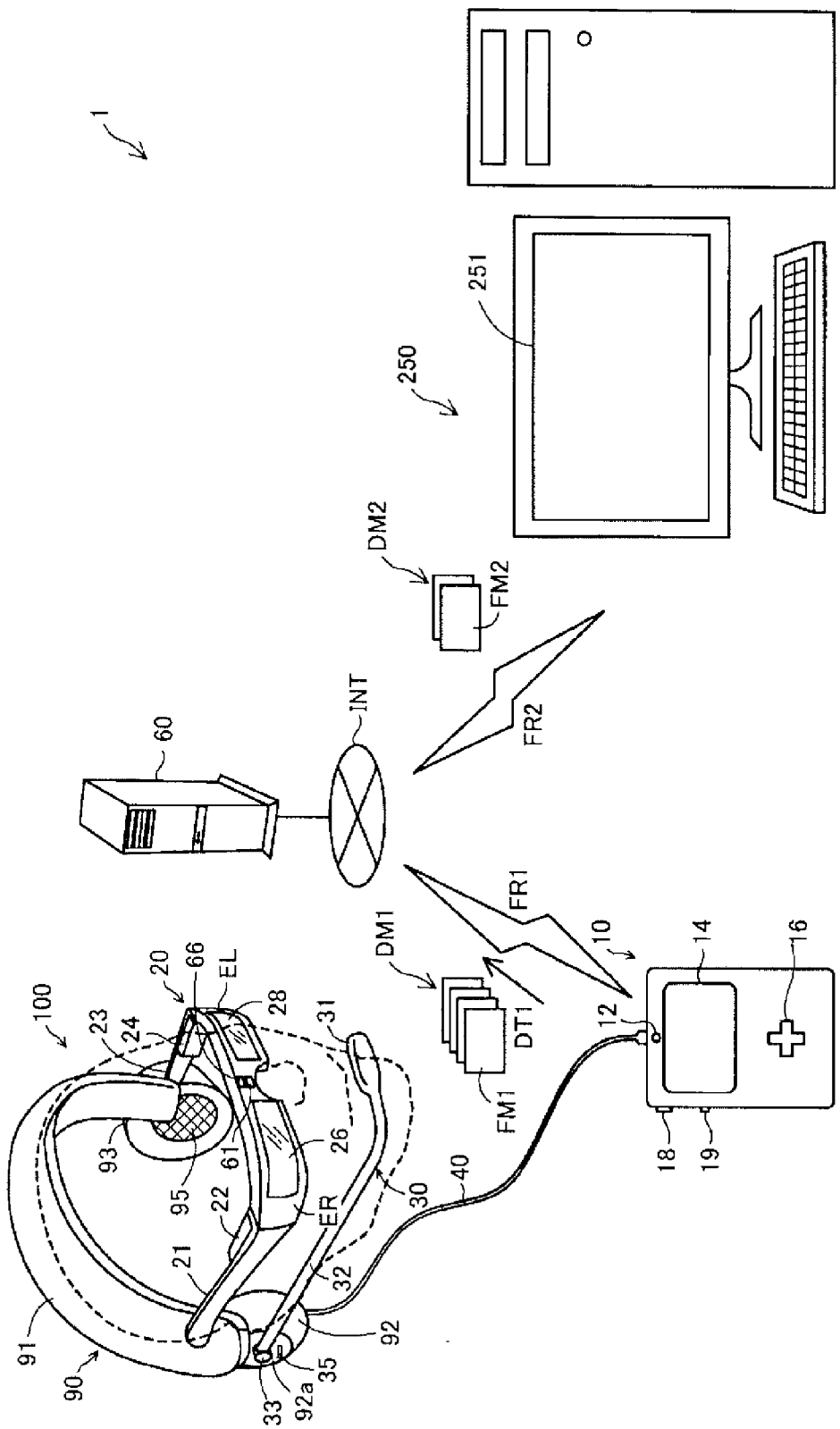
FIG. 1 is an explanatory diagram showing the schematic configuration of a display system in a first embodiment.
Figure 2:
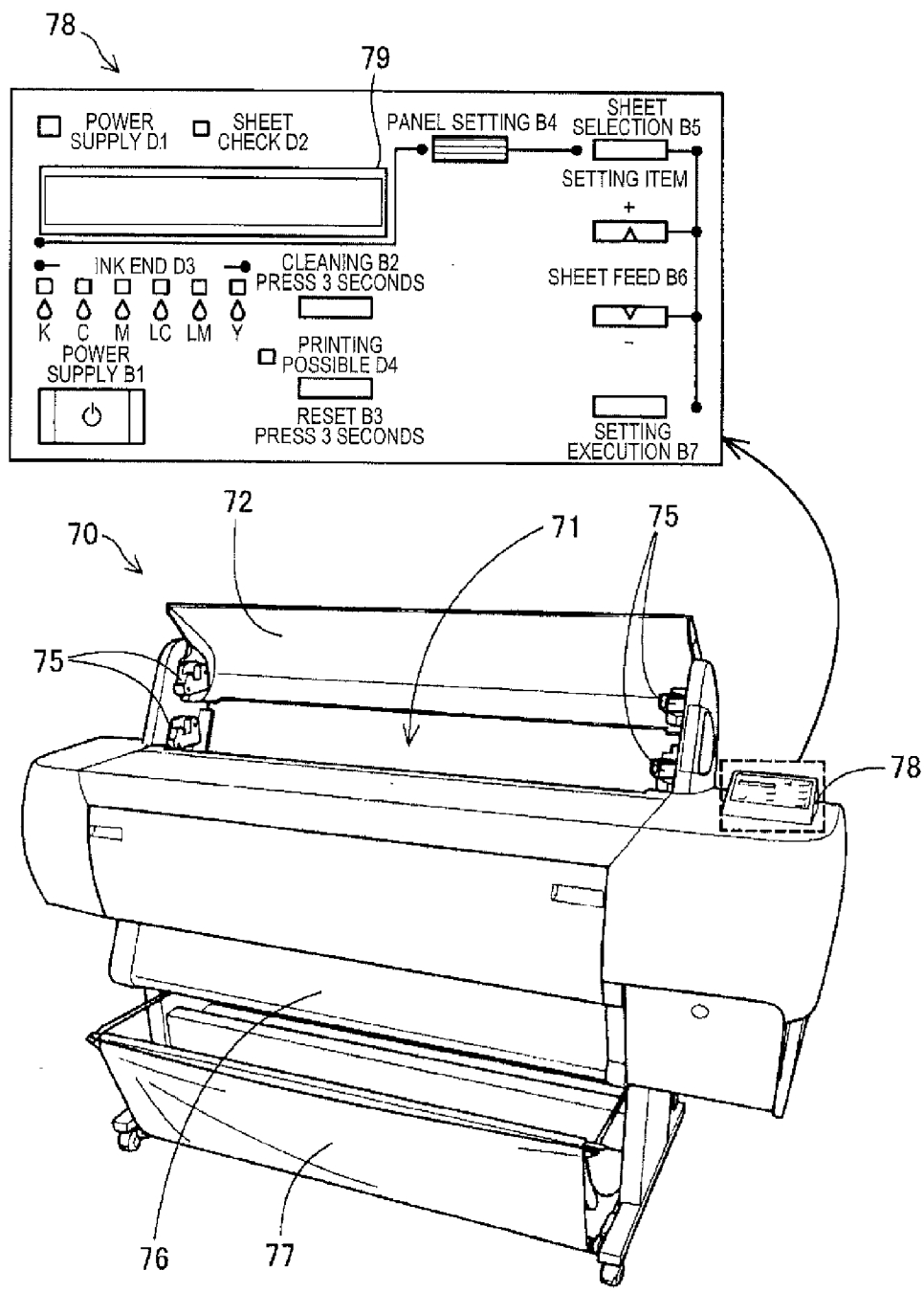
FIG. 2 is an exterior perspective view of a printer serving as a work target object.

FIG. 1 is an explanatory diagram showing the schematic configuration of a display system in a first embodiment of the invention. FIG. 2 is an exterior perspective view of a printer 70 serving as a work target object.

A display system 1 (FIG. 1) includes a head-mounted display device 100 functioning as an image display device, a server 60 functioning as a data processing device (an information processing device), and a personal computer (PC) 250 functioning as a display device. The PC 250 includes a display section 251 for displaying an image. The display section 251 displays a moving image transmitted from the head-mounted display device 100 through the server 60.

The head-mounted display device 100 is connected to the Internet INT by radio communication via a communication carrier BS. The PC 200 is connected to the Internet INT by radio communication via the communication carrier BS. The server 60 is connected to the Internet INT by wired communication. As a result, the server 60, the head-mounted display device 100, and the PC 250 can perform data communication one another via the Internet INT. The communication carrier BS includes a transmission/reception antenna, a radio base station, and a switching station.

The display system 1 can be used as, for example, a remote support system. For example, the remote support system causes the remote display section 251 to display a moving image acquired by the head-mounted display device 100 worn by a user. An instructor operating the PC 250 instructs the user about work contents on the basis of the moving image. In this embodiment, the operation of the display system 1 at the time when the user performs initial setting and maintenance/inspection of the printer 70 functioning as the work target object shown in FIG. 2 is explained. That is, the remote support system acquires, with the head-mounted display device 100, a moving image including the printer 70 and causes the display section 251 to display the acquired moving image. The instructor operating the PC 100 instructs the user about work contents for the printer 70.

The printer 70 (FIG. 2) is an inkjet printer that conveys not-shown roll paper, ejects an ink on the roll paper, and forms an image. The printer 70 includes a paper feeding slot 71 in which the roll paper is disposed, a spindle bearing 75 in which a spindle of the roll paper is set, an open-closable cover 72 that covers the roll paper, a discharge section 76 from which the roll paper, on which the image is formed, is discharged, a box-type holding section 77 that holds the discharged roll paper, and an operation panel 78 for displaying a state (e.g., an ink end state and a power supply state) of the printer 70 and setting the operation of the printer 70.

The operation panel 78 includes various buttons B1 to B6 for controlling the operation (e.g., power ON/OFF) of the printer 70, various lamps D1 to D4 for displaying the state of the printer 70, and a display 79 that displays, for example, the state of the printer 70.

The head-mounted display device 100 (FIG. 1) is a display device mounted on a head and is called head mounted display (HMD) as well. The HMD 100 in this embodiment is a head mounted display of an optical transmission type with which the user can visually recognize a virtual image and, at the same time, directly visually recognize an outside scene.

The server 60 receives moving image data DM1 and detection information DT1 of a nine-axis sensor 66 included in the HMD 100 from the HMD 100. The server 60 receives the moving image data DM1 at a first frame rate FR1. The server 60 applies, on the basis of the received moving image data DM1 and the received detection information DT1, predetermined data processing to frame image data FM1 configuring the moving image data DM1 and generates frame image data for display FM2. The server 60 sequentially transmits the generated frame image data for display FM2 to the PC 250. The server 60 is capable of transmitting the frame image data for display FM2 to the PC 250 at a second frame rate FR2. The second frame rate FR2 is lower than the first frame rate FR1. For example, the first frame rate FR1 is 30 fps and the second frame rate FR2 is 5 fps. Note that, since the frame image data forms an image displayed by the display section 251, the frame image data can be referred to as frame image as well.

The PC 250, which has received the frame image data for display FM2, causes the display section 251 to display the frame image data for display FM2 at the second frame rate FR2. Consequently, the display section 251 displays a moving image represented by moving image data DM2. When the display system 1 is used as the remote support system, the instructor views the moving image displayed on the display section 251 and instructs the user wearing the HMD 100 about work contents and the like. Note that details of data processing of the frame image data FM1 executed by the server 60 are explained below.

A-2. Configuration of the Head-Mounted Display Device (HMD)

Figure 3:
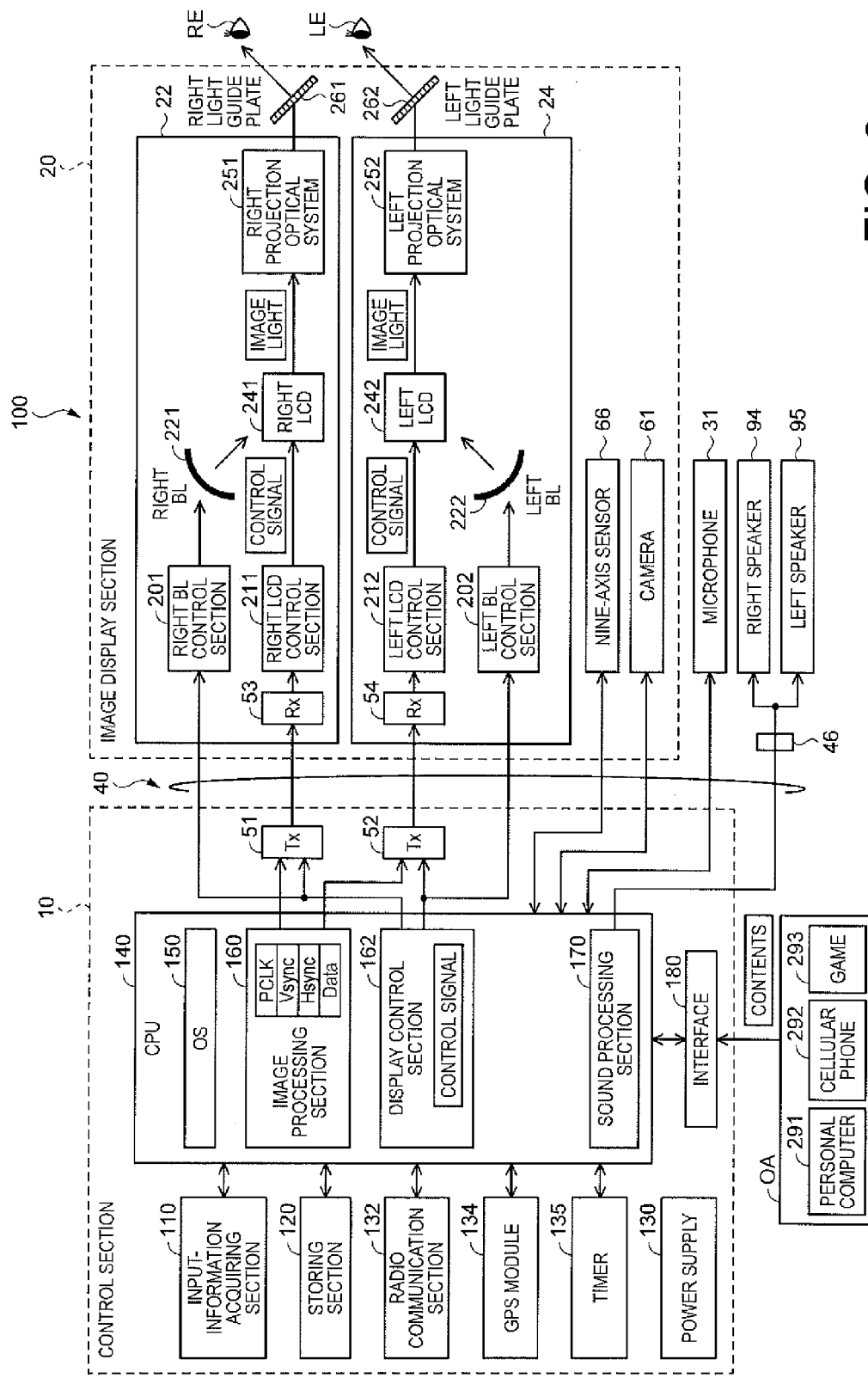
FIG. 3 is a block diagram functionally showing the configuration of an HMD in the first embodiment.

FIG. 3 is a Block Diagram Functionally Showing the configuration of the HMD 100. The configuration of the HMD 100 is explained with reference to FIGS. 1 and 3. As shown in FIG. 1, the HMD 100 includes a headphone section 90, an image display section 20, a microphone section 30, and a control section 10.

The headphone section 90 is wearable on the head of the user. The headphone section 90 includes a headband 91 bent to be wearable along the head and right and left ear cups 92 and 93 provided at both ends of the headband 91. An acoustic speaker 94 (FIG. 3) for a right channel is provided on the inside of the ear cup 92 on the right side. An acoustic speaker 95 (FIG. 3) for a left channel is provided on the inside of the ear cup 93 on the left side. The image display section 20 is attached to the headband 91 in a fixed form.

The image display section 20 is capable of causing the user to visually recognize a virtual image in a state in which the image display section 20 is worn on the head of the user. The image display section 20 has an eyeglass shape. The image display section 20 includes a right holding section 21, a right display driving section 22, a left holding section 23, a left display driving section 24, a right optical-image display section 26, and a left optical-image display section 28. The right optical-image display section 26 and the left optical-image display section 28 are respectively located in front of the right eye and in front of the left eye of the user when the user wears the headband 91. One end of the right optical-image display section 26 and one end of the left optical-image display section 28 are connected to each other in a position corresponding to the middle of the forehead of the user at the time when the user wears the image display section 20.

The right holding section 21 extends from an end portion ER, which is the other end of the right optical-image display section 26, in substantially the horizontal direction and is fixed to the vicinity of the end portion on the right side of the headband 91. Similarly, the left holding section 23 extends from an end portion EL, which is the other end of the left optical-image display section 28, in substantially the horizontal direction and is fixed to the vicinity of the end portion on the left side of the headband 91. The right holding section 21 and the left holding section 23 hold the optical-image display sections 26 and 28 such that the optical-image display sections 26 and 28 are located in front of the eyes of the user wearing the headband 91 on the head.

The right display driving section 22 is disposed on the inner side of the right holding section 21, in other words, on a side opposed to the head of the user at the time when the user wears the image display section 20. The left display driving section 24 is disposed on the inner side of the left holding section 23. Note that, in the following explanation, the right holding section 21 and the left holding section 23 are explained as "holding sections" without being distinguished. Similarly, the right display driving section 22 and the left display driving section 24 are explained as "display driving sections" without being distinguished. The right optical-image display section 26 and the left optical-image display section 28 are explained as "optical-image display sections" without being distinguished.

The display driving sections include liquid crystal displays (hereinafter referred to as "LCDs") 241 and 242 and projection optical systems 251 and 252 (FIG. 3). Details of the configuration of the display driving sections are explained below. The optical-image display sections functioning as optical members include light guide plates 261 and 262 (FIG. 3) and dimming plates. The light guide plates 261 and 262 are formed of a light transmissive resin material or the like and guide image lights output from the display driving sections to the eyes of the user. The dimming plates are thin plate-like optical elements and are disposed to cover the front side (a side opposite to the side of the eyes of the user) of the image display section 20. The dimming plates protect the light guide plates 261 and 262 and suppress damage, adhesion of stain, and the like to the light guide plates 261 and 262. By adjusting the light transmittance of the dimming plates, it is possible to adjust an external light amount entering the eyes of the user and adjust easiness of visual recognition of a virtual image. Note that the dimming plates can be omitted.

The microphone section 30 (FIG. 1) includes a microphone 31, an arm 32, and a coupling section 33. The microphone 31 is a sound input section that converts sound into an electric signal and is connected to the distal end of the arm 32. An end portion of the arm 32 on the opposite side of the microphone 31 is coupled to an upper surface 92a of the right ear cup 92 of the image display section 20 by the coupling section 33. According to the coupling, the microphone 31 is located in front of the mouth of the user. Note that the coupling section 33 couples the arm 32 to be capable of turning and to be capable of being fixed in any position.

An integrated object of the image display section 20, the microphone section 30, and the headphone section 90 and the control section 10 are connected by a connection cord 40. One end of the connection cord 40 is inserted into the right ear cup 92 of the headphone section 90, divided according to necessity, and connected to the left and right display driving sections 22 and 24 of the image display section 20, the left and right speakers 94 and 95, and the microphone 31 of the microphone section 30. The other end of the connection cord 40 is connected to the control section 10. Connectors (not shown in the figure) fitting with each other are respectively provided at the end portion on the opposite side of the right ear cup 92 in the connection cord 40 and the control section 10. The integrated object and the control section 10 are connected and disconnected according to fitting and unfitting of the connector of the connection cord 40 and the connector of the control section 10. As the connection cord 40, for example, a metal cable and an optical fiber can be adopted.

The control section 10 (FIG. 1) is a device for controlling the HMD 100. The control section 10 includes a lighting section 12, a touch pad 14, a cross key 16, and a power switch 18. The lighting section 12 notifies, with a light emission form thereof, an operation state (e.g., power ON/OFF) of the HMD 100. As the lighting section 12, for example, an LED (Light Emitting Diode) can be used. The touch pad 14 detects touch operation on an operation surface of the touch pad 14 and outputs a signal corresponding to detection content. As the touch pad 14, various touch pads of an electrostatic type, a pressure detection type, and an optical type can be adopted. The cross key 16 detects pressing operation on center portions of keys corresponding to the upward, downward, left, and right directions and a cross key and outputs a signal corresponding to detection content. The power switch 18 detects slide operation of a switch to switch a state of a power supply of the HMD 100.

The control section 10 (FIG. 3) includes an input-information acquiring section 110, a storing section 120, a power supply 130, a radio communication section 132, a GPS module 134, a CPU 140, an interface 180, transmitting sections (Txs) 51 and 52, and a timer 135. The sections are connected to one another by a not-shown bus.

The input-information acquiring section 110 acquires, for example, signals corresponding to operation inputs to the touch pad 14, the cross key 16, the power switch 18, and the like. The storing section 120 is configured by a ROM, a RAM, a DRAM, a hard disk, or the like.

The power supply 130 supplies electric power to the sections of the HMD 100. As the power supply 130, for example, a secondary battery such as a lithium polymer battery or a lithium ion battery can be used. Further, instead of the secondary battery, a primary battery or a fuel battery may be used. Alternatively, the sections may receive wireless power supply and operate. The sections may receive power supply from a solar cell and a capacitor. The radio communication section 132 performs radio communication with other apparatuses according to a predetermined radio communication standard such as a wireless LAN, Bluetooth (registered trademark), or iBeacon (registered trademark). The GPS module 134 receives a signal from a GPS satellite to thereby detect the present position of the GPS module 134.

The CPU 140 reads out and executes computer programs stored in the storing section 120 to thereby function as an operating system (OS) 150, an image processing section 160, a display control section 162, and a sound processing section 170.

The image processing section 160 generates a signal on the basis of contents (videos) input via the interface 180 and the radio communication section 132. The image processing section 160 supplies the generated signal to the image display section 20 via the connection cord 40 to control the image display section 20. The signal to be supplied to the image display section 20 is different in an analog format and a digital format. In the case of the analog format, the image processing section 160 generates and transmits a clock signal PCLK, a vertical synchronization signal VSync, a horizontal synchronization signal HSync, and image data Data. Specifically, the image processing section 160 acquires an image signal included in contents. For example, in the case of a moving image, in general, the acquired image signal is an analog signal configured from thirty frame images per one second. The image processing section 160 separates synchronization signals such as the vertical synchronization signal VSync and the horizontal synchronization signal HSync from the acquired image signal and generates the clock signal PCLK with a PLL circuit or the like according to cycles of the synchronization signals. The image processing section 160 converts the analog image signal, from which the synchronization signals are separated, into a digital image signal using an A/D conversion circuit or the like. The image processing section 160 stores the digital image signal after the conversion in the DRAM in the storing section 120 frame by frame as the image data Data of RGB data.

On the other hand, in the case of the digital format, the image processing section 160 generates and transmits the clock signal PCLK and the image data Data. Specifically, when the contents are the digital format, the clock signal PCLK is output in synchronization with the image signal. Therefore, the generation of the vertical synchronization signal VSync and the horizontal synchronization signal HSync and the A/D conversion of the analog image signal are unnecessary. Note that the image processing section 160 may execute, on the image data Data stored in the storing section 120, image processing such as resolution conversion processing, various kinds of tone correction processing such as adjustment of luminance and chroma, and keystone correction processing.

The image processing section 160 transmits the generated clock signal PCLK, the generated vertical synchronization signal VSync, and the generated horizontal synchronization signal HSync and the image data Data stored in the DRAM in the storing section 120 respectively via the transmitting sections 51 and 52. Note that the image data Data transmitted via the transmitting section 51 is referred to as "image data for right eye Data1" as well. The image data Data transmitted via the transmitting section 52 is referred to as "image data for left eye Data2" as well. The transmitting sections 51 and 52 function as a transceiver for serial transmission between the control section 10 and the image display section 20.

The display control section 162 generates control signals for controlling the right display driving section 22 and the left display driving section 24. Specifically, the display control section 162 individually controls, with the control signals, driving ON/OFF of a right LCD 241 by a right LCD control section 211, driving ON/OFF of a right backlight 221 by a right backlight control section 201, driving ON/OFF of a left LCD 242 by a left LCD control section 212, and driving ON/OFF of a left backlight 222 by a left backlight control section 202, and the like to thereby control generation and emission of image lights respectively by the right display driving section 22 and the left display driving section 24. The display control section 162 transmits the control signals for the right LCD control section 211 and the left LCD control section 212 respectively via the transmitting sections 51 and 52. Similarly, the display control section 162 transmits the control signals respectively to the right backlight control section 201 and the left backlight control section 202.

The sound processing section 170 acquires a sound signal from the outside (e.g., contents), amplifies the acquired sound signal, and supplies the sound signal to the speaker 94 in the right ear cup 92 and the speaker 95 in the left ear cup 93 connected to a coupling member 46. Note that, for example, when a Dolby (registered trademark) system is adopted, processing for the sound signal is performed.

Different kinds of sound with varied frequencies or the like are respectively output from the right and left speakers 94 and 95.

The interface 180 is an interface for connecting various external apparatuses OA, which are supply sources of contents, to the control section 10. Examples of the external apparatuses OA include a personal computer 291, a cellular phone terminal 292, and a game terminal 293. As the interface 180, for example, a USB interface, a micro USB interface, and an interface for a memory card can be used.

The image display section 20 includes the right display driving section 22, the left display driving section 24, a right light guide plate 261 functioning as the right optical-image display section 26, a left light guide plate 262 functioning as the left optical-image display section 28, a camera 61 (see FIG. 1 as well) functioning as an image pickup section, and the nine-axis sensor 66. The timer 135 has a function of detecting the present time.

The camera 61 is an RGB camera and is disposed in a position corresponding to the root of the nose of the user at the time when the user wears the image display section 20. Therefore, the camera 61 picks up a color image of an outside world in a predetermined direction of the HMD 100, that is, a direction that the user faces in a state in which the user wears the image display section 20 on the head. Note that the camera 61 can be a monochrome camera instead of the RGB camera. The camera 61 picks up a moving image. The picked-up moving image is stored in the storing section 120 as the moving image data DM1 configured from a plurality of frame image data FM1. Time data at a point in time when the frame image data FM1 is stored in the storing section 120 is given to the frame image data FM1 by the timer 135. The point in time when the frame image data FM1 is stored in the storing section 120 can also be considered a point in time when the frame image data FM1 is generated.

The nine-axis sensor 66 functioning as a sensor is a motion sensor that detects acceleration (three axes of an X axis, a Y axis, and a Z axis), angular velocity (three axes), and terrestrial magnetism (three axes). In this embodiment, the nine-axis sensor 66 is disposed in a position corresponding to the middle of the forehead of the user. The nine-axis sensor 66 is provided in the image display section 20. Therefore, when the image display section 20 is worn on the head of the user, the nine-axis sensor 66 can detect a movement of the head of the user (specifically, the camera 61) on the basis of the detection information DT1 of the nine-axis sensor 66. The direction of the image display section 20, that is, a visual field of the user can be specified from the detected movement of the head. Sensor detection information of the nine-axis sensor 66 is stored in the storing section 120. Time data at a point in time when the detection information DT1 is stored in the storing section 120 is given to the detection information DT1 by the timer 135. As explained above, the time data serving as the same identification information are given to the frame image data FM1 and the detection information DT1. The frame image data FM1 and the detection information DT1 can be easily associated by the time data. Note that the identification information is not limited to the time data. For example, the identification information may be data (e.g., number data) representing the same content.

The right display driving section 22 includes a receiving section (Rx) 53, the right backlight (BL) control section 201 and the right backlight (BL) 221 functioning as a light source, the right LCD control section 211 and the right LCD 241 functioning as a display element, and a right projection optical system 251. Note that the right backlight control section 201, the right LCD control section 211, the right backlight 221, and the right LCD 241 are collectively referred to as "image-light generating section" as well.

The receiving section 53 functions as a receiver for serial transmission between the control section 10 and the image display section 20. The right backlight control section 201 drives the right backlight 221 on the basis of an input control signal. The right backlight 221 is, for example, a light emitting body such as an LED or an electroluminescence (EL) element. The right LCD control section 211 drives the right LCD 241 on the basis of the clock signal PCLK, the vertical synchronization signal VSync, the horizontal synchronization signal HSync, and the image data for right eye Data1 input via the receiving section 53. The right LCD 241 is a transmissive liquid crystal panel on which a plurality of pixels are arranged in a matrix shape. The right LCD 241 changes, by driving liquid crystal in pixel positions arranged in the matrix shape, the transmittance of light transmitted through the right LCD 241 to thereby modulate illumination light radiated from the right backlight 221 into effective image light representing an image.

The right projection optical system 251 is configured by a collimate lens that changes the image light emitted from the right LCD 241 to light beams in a parallel state. The right light guide plate 261 functioning as the right optical-image display section 26 guides the image light output from the right projection optical system 251 to the right eye RE of the user while reflecting the image light along a predetermined optical path. For the optical-image display section, any system can be used as long as the optical-image display section forms a virtual image in front of the eyes of the user using the image light. For example, a diffraction grating may be used or a semitransparent reflection film may be used. Note that the HMD 100 emitting the image light is also referred to as "display an image" in this specification.

The left display driving section 24 includes a configuration same as the configuration of the right display driving section 22. That is, the left display driving section 24 includes a receiving section (Rx) 54, the left backlight (BL) control section 202 and the left backlight (BL) 222 functioning as a light source, the left LCD control section 212 and the left LCD 242 functioning as a display element, and a left projection optical system 252. Like the right LCD 241, the left LCD 242 changes, by driving liquid crystal in pixel positions arranged in the matrix shape, the transmittance of light transmitted through the left LCD 242 to thereby modulate illumination light radiated from the left backlight 222 into effective image light representing an image. Note that, although a backlight system is adopted in this embodiment, the image light may be emitted using a front light system or a reflection system.

Figure 4:
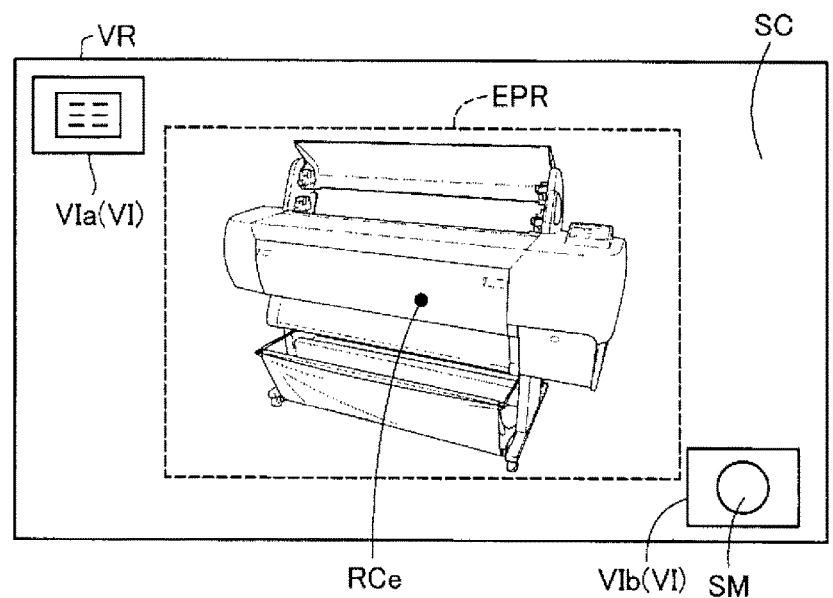
FIG. 4 is an explanatory diagram showing an example of augmented reality display by the HMD.

FIG. 4 is an explanatory diagram showing an example of augmented reality display by the HMD 100. In FIG. 4, a visual field VR of the user is illustrated. The image lights guided to both the eyes of the user of the HMD 100 are focused on the retinas of the user, whereby the user visually recognizes a image VI serving as augmented reality (AR). The optical-image display sections 26 and 28 transmit light from an outside world SC, whereby the user visually recognizes the outside world SC. In this way, the user of the HMD 100 in this embodiment can view the image VI and the outside scene SC behind the image VI in a portion where the image VI is displayed in the visual field VR. The user can view only the outside world SC in a portion where the image VI is not displayed in the visual field VR.

In the example shown in FIG. 4, images VIa and VIb are waiting screens for the user to perform predetermined work.

In the image VIb on the lower right, a data processing start mark SM serving as a trigger for data processing of the frame image data FM1 executed by the server 60 is displayed. In the image VIa on the upper left, an image picked up by the camera 61 is displayed. The user sets the direction of the camera 61 by adjusting, with reference to the image via picked up by the camera 61, the position of the head such that a target object of attention (e.g., the operation panel 78) is in a center RCe of an image pickup region CPR. The user selects the data processing start mark SM. Consequently, the frame image data FM1 in which the target object of attention is arranged in the center RCe of the image pickup region CPR, that is, the frame image data FM1 given with processing start data SD is generated and stored in the storing section 120.

A-3. Configuration of the Server

Figure 5:
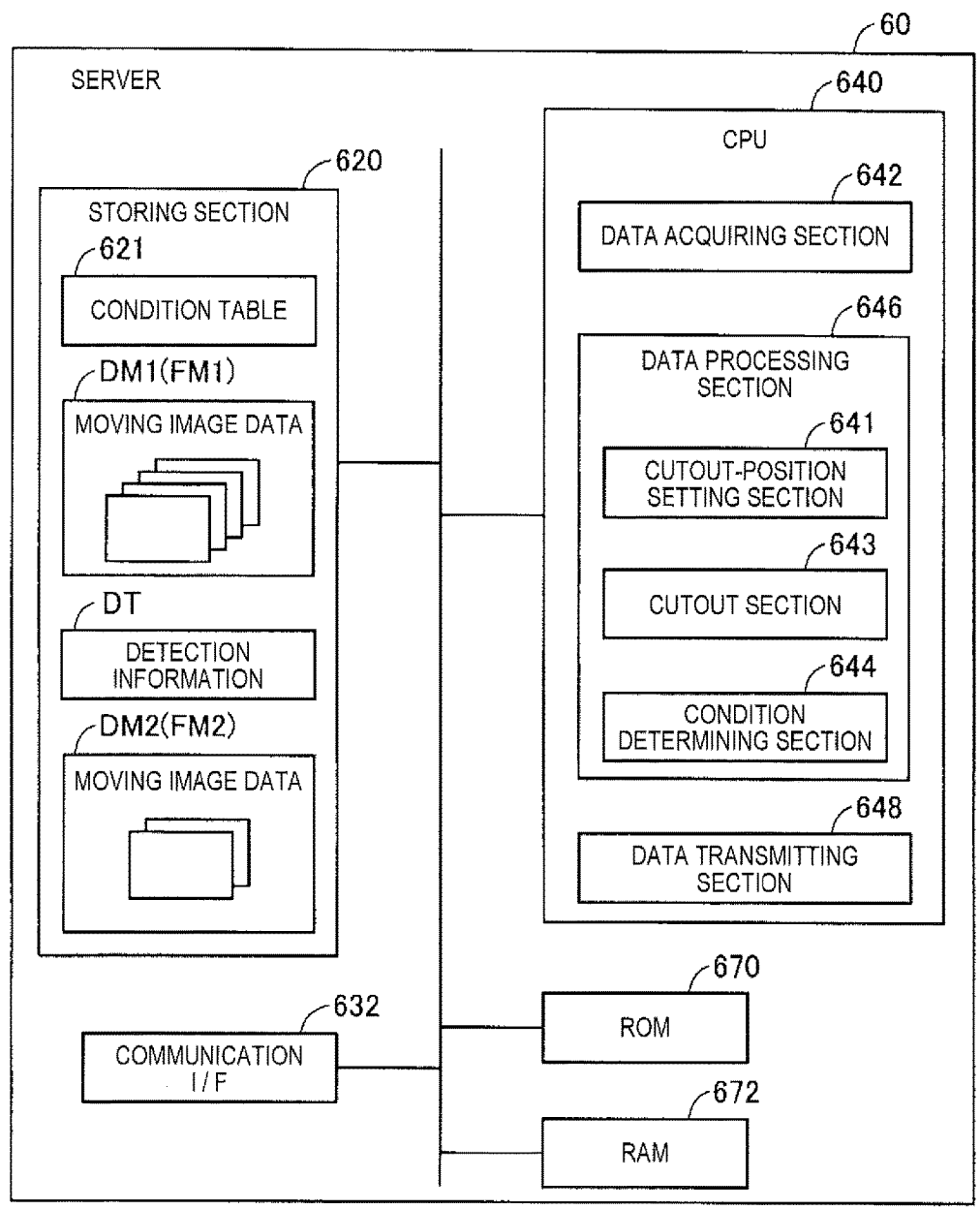
FIG. 5 is a block diagram functionally showing the configuration of a server.

FIG. 5 is a block diagram functionally showing the configuration of the server 60. The server 60 includes a CPU 640, a ROM 670, a RAM 672, a communication interface (I/F) 632, and a storing section 620. The sections are connected to one another by a not-shown bus.

The CPU 640 develops, in the RAM 672, computer programs stored in the ROM 320 or the storing section 620 and executes the computer programs to thereby control the sections of the server 60. Besides, the CPU 640 also functions as a data acquiring section 642 that acquires data from the outside through the communication interface (I/F) 632 and a data transmitting section 648 that transmits data to the outside through the communication i/F 632.

A communication interface 340 includes a radio communication interface and a wired communication interface. The radio communication interface includes a not-shown transmission/reception circuit and performs demodulation of a radio wave received via an antenna and generation of data and generation and modulation of a radio wave transmitted via the antenna. The wired communication interface is connected to other devices via a wired cable.

A storing section 350 is configured by a DRAM, a hard disk, and the like. The storing section 350 stores a condition table 621 used by a condition determining section 644. The storing section 350 stores the moving image data DM1 picked up by the camera 61.

The CPU 640 transfers a computer program stored in the ROM 670 to the RAM 672 and executes the computer program to thereby function as a data processing section 646. The data processing section 646 includes a cutout-position setting section 641, a cutting out section 643, and a condition determining section 644. The data processing section 646 extracts a part of the plurality of frame image data FM1 stored in the storing section 620 and performs data processing on the extracted frame image data FM1 to generate the frame image data for display FM2. The data processing section 646 is capable of transmitting the frame image data for display FM2 to the PC 250 at the second frame rate FR2 via the data transmitting section 648.

The cutting out section 643 cuts out, with respect to the frame image data FM1 configuring the moving image data DM1, a predetermined cutout region from a frame image represented by the frame image data FM1 and generates the frame image data for display FM2 to be displayed by the display section 251.

Figure 6A:
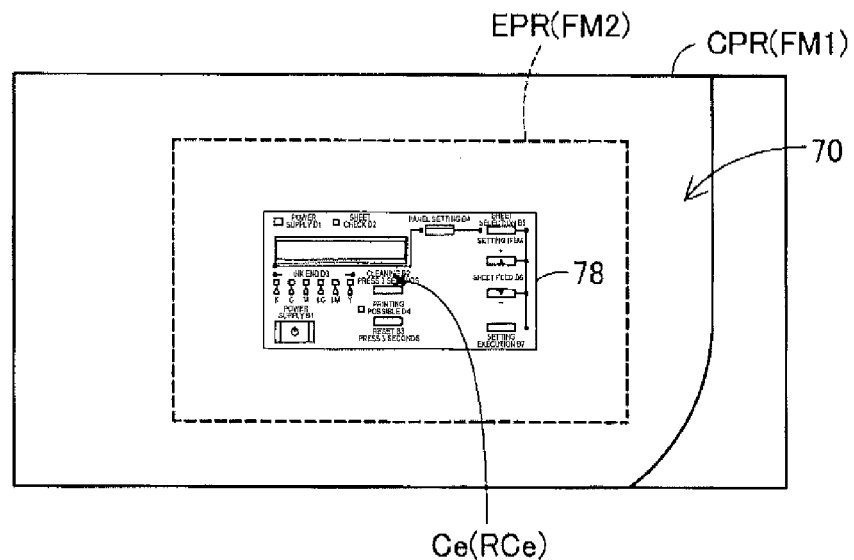
FIGS. 6A and 6B are diagrams for explaining a relation between a cutout region and an image pickup region.
Figure 6B:
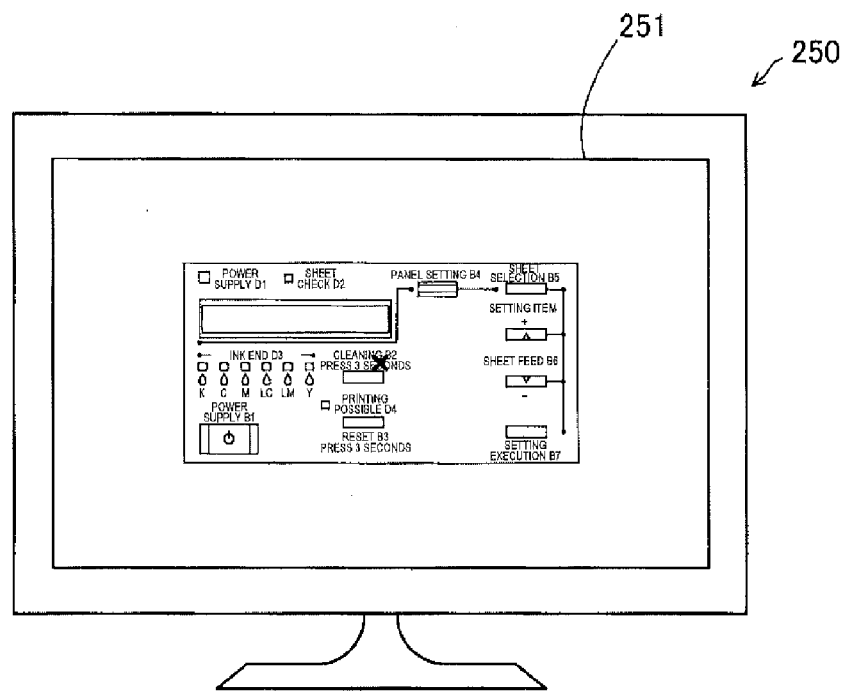

FIGS. 6A and 6B are diagrams for explaining a relation between a cutout region EPR and an image pickup region CPR of the camera 61 represented by the frame image data FM1. When an image of the image pickup region CPR including the operation panel 78 is picked up by the camera 61, the cutting out section 643 cuts out the cutout region EPR smaller than the image pickup region CPR from a frame image and generates the frame image data for display FM2. The PC 250 causes the display section 251 to display the frame image data for display FM2 such that the sizes of the cutout region EPR and the display region of the display section 251 coincide with each other. In a normal mode of the server 60 before receiving the processing start data SD, a center position Ce serving as a specified position of the cutout region EPR is set in the center RCe of the image pickup region CPR. When receiving the processing start data SD, the server 60 shifts to a processing mode. In the processing mode, the position of the center position Ce is determined according to whether a predetermined condition is satisfied. Note that the specified position is not limited to the center position Ce as long as the specified position specifies the position of the cutout region EPR. For example, a coordinate position of at least one of four corners of the cutout region EPR may be set as the specified position.

In this embodiment, the size of the cutout region EPR is a fixed value set in advance. Note that the size of the cutout region EPR is not limited to this and may be changed according to the distance between the HMD 10 (specifically, the camera 61) and a predetermined target object (e.g., the operation panel 78 of the printer 70) included in the frame image represented by the frame image data FM1 as long as the cutout region EPR is a region smaller than the image pickup region CPR.

In the processing mode, the cutout-position setting section 641 (FIG. 5) sets a center position of the cutout region EPR on the basis of a region of attention that should be paid attention. The condition determining section 644 determines whether a movement of the camera 61 detected according to the detection information DT1 of the nine-axis sensor 66 satisfies a predetermined condition specified in the condition table 621. The condition determining section 644 determines whether the processing start data SD is given to the frame image data FM1.

The cutting out section 643 generates the frame image data for display FM2 from the frame image data FM1 using the cutout region EPR, the center position of which is set by the cutout-position setting section 641. The frame image data for display FM2 is stored in the storing section 620.

The data transmitting section 648 transmits the plurality of frame image data for display FM2 configuring the moving image data DM2 stored in the storing section 620 to the PC 250 at the second frame rate FR2 on the basis of an instruction from the data processing section 646. A-4. Processing flow for image data executed by the CPU 640

A-4. Processing Flow for Image Data Executed by the CUP 640

Figure 7:
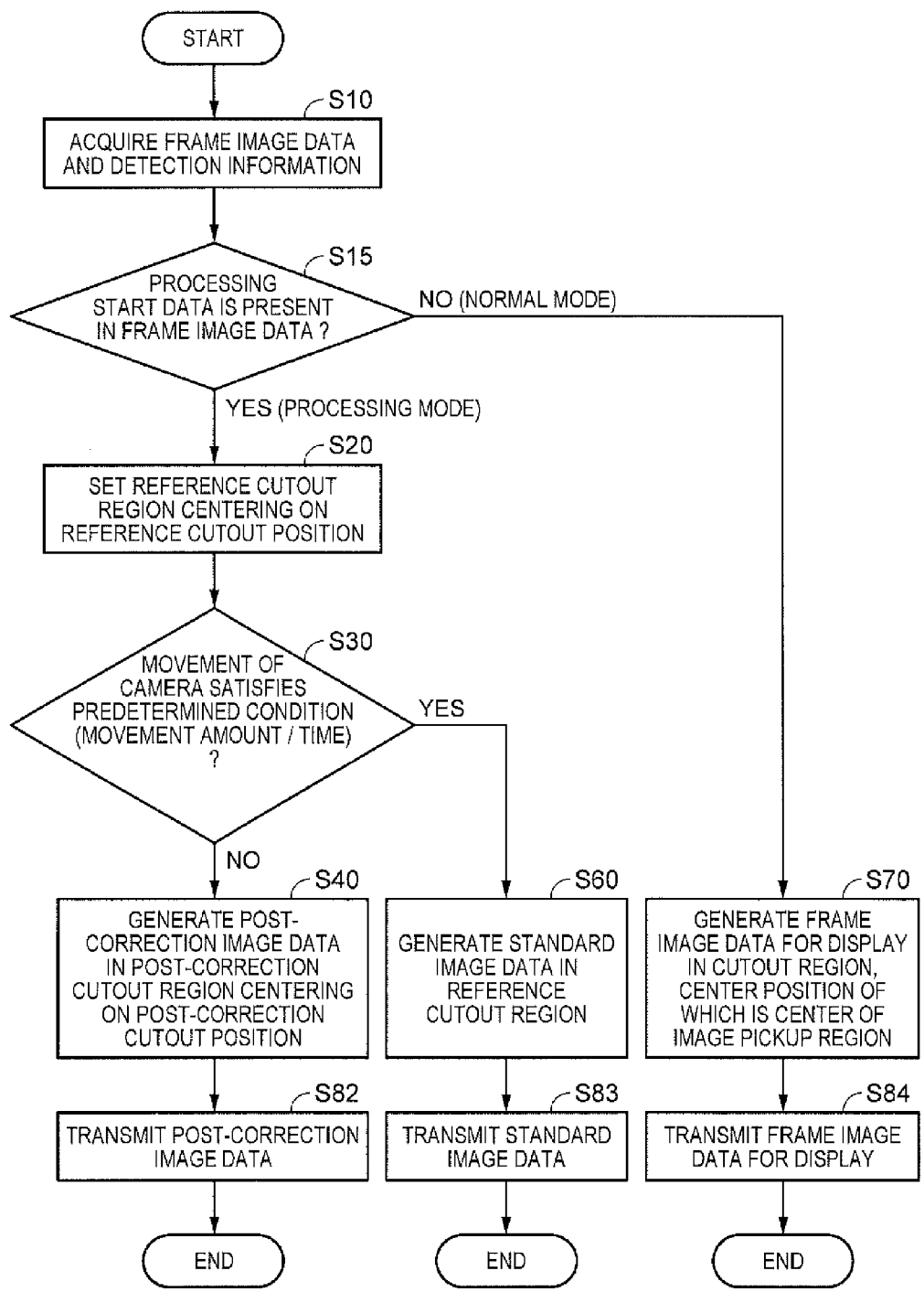
FIG. 7 is a flowchart of a processing flow of image data executed by a CPU.

FIG. 7 is a flowchart of a processing flow for image data executed by the CPU 640. The processing flow shown in FIG. 7 is executed after communication between the HMD 60 and the server 60 and communication between the server 60 and the PC 250 are established.

First, the data acquiring section 642 of the server 60 acquires, at a fixed time interval, the frame image data FM1 and the detection information DT1 stored in the storing section 120 of the HMD 10 and causes the storing section 620 to store the frame image data FM1 and the detection information DT1 (step S10).

The condition determining section 644 determines whether the processing start data SD is given to the frame image data FM1 (step S15). When it is determined that the processing start data SD is not given to the frame image data FM1, the server 60 generates the frame image data for display FM2 according to the normal mode. That is, the cutting out section 643 cuts out a frame image in the cutout region EPR, the center position Ce of which is the center RCe of the image pickup region CPR, and generates the frame image data for display FM2 (step S70). The frame image data for display FM2 generated in step S70 is transmitted to the PC 250 by the data transmitting section 648 (step S84).

When it is determined that the processing start data SD is given to the frame image data FM1, the server 60 generates the frame image data for display FM2 according to the processing mode. First, the cutout-position setting section 641 sets, with respect to the frame image data FM1 given with the processing start data SD, the cutout region EPR centering on a reference cutout position Cs (step S20). The cutout region EPR centering on the reference cutout position Cs is referred to as reference cutout region EPRs as well. In this embodiment, the reference cutout position Cs is a coordinate position of the center RCe of the image pickup region CPR.

Figure 8:
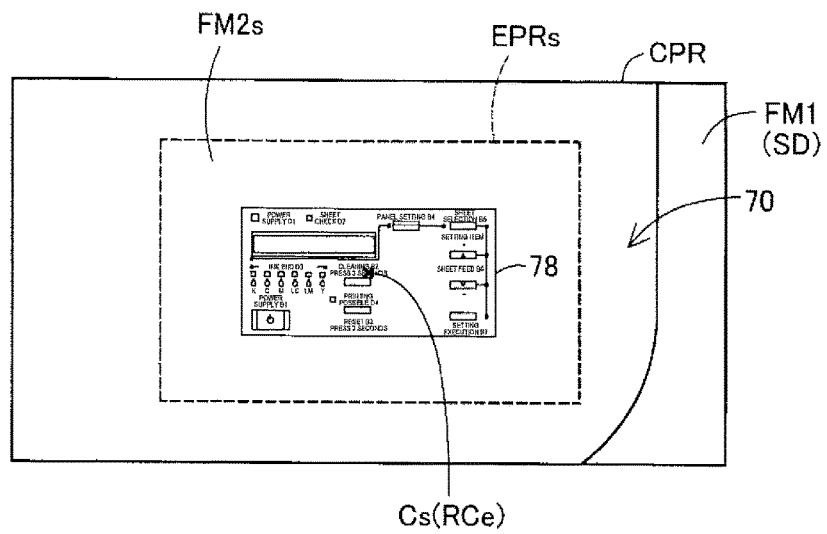
FIG. 8 is a diagram for explaining a reference cutout region set by a cutout-position setting section.

FIG. 8 is a diagram for explaining the reference cutout region EPRs set by the cutout-position setting section 641. In this embodiment, the cutout-position setting section 641 estimates that the center of the visual field of the user of the HMD 100 and the periphery of the center is a region of attention and sets the center of the visual field of the user as the reference cutout position Cs. That is, the cutout-position setting section 641 sets, as the reference cutout position Cs, the center RCe of the image pickup region CPR represented by the frame image data FM1. For example, in a work scene in which the operation panel 78 is a work target, the user sets, with reference to the image Via (FIG. 4) picked up by the camera 61, the direction of the camera 61 such that the operation panel 78 is the center RCe of the image pickup region CPR. The user selects the data processing start mark SM (FIG. 4). Consequently, the frame image data FM1 in which the operation panel 78 is disposed in the center RCe of the image pickup region CPR, that is, the frame image data FM1 given with the processing start data SD is generated.

After step S20, the condition determining section 644 calculates the movement of the camera 61 on the basis of the detection information DT1 of the nine-axis sensor 66 and determines whether the calculated movement satisfies the predetermined condition stored in the condition table 621 (step S30). The predetermined condition includes a movement amount of the camera 61 and a time period from reference time generated from the processing start data SD. The predetermined condition is desirably set to conditions with which it is possible to determine whether the user has intentionally changed a target object on which work is performed.

The predetermined condition is a condition that the movement amount of the camera 61 is continuously a predetermined threshold or more for a predetermined time. The predetermined threshold is a threshold concerning at least one of a movement amount along the horizontal direction, a movement amount along the vertical direction, and movement amounts in rotating directions about aces (the X axis, the Y axis, and the Z axis). The predetermined threshold is desirably set to a value equal to or larger than a maximum shake amount of the head at the time when the user is performing work (operation) on a target object. The predetermined time is desirably set to a degree of a time period in which it is possible to presume that the user has intentionally changed a target object on which work is performed.

In this embodiment, the predetermined condition is a condition explained below.
Predetermined Condition When the position of the camera 61 at reference time t0 when the processing start data SD is generated is set as a reference position, a movement amount (an angle change) in a rotating direction of the camera 61, the absolute value of which is equal to or larger than θa, continuously occurs for a predetermined time Pt or more centering on the vertical direction.

The predetermined time Pt is set in a range of, for example, 2 to 6 seconds.

If the condition determining section 644 determines that the movement satisfies the predetermined condition (YES in step S30), processing in step S60 is executed. That is, the cutout section 643 sets a center position of a cutout region for cutting out a frame image to the reference cutout position Cs set in advance and generates the frame image data for display (the standard image data) FM2 (step S60). That is, the cutout section 643 cuts out, in the reference cutout region EPRs, the frame image represented by the frame image data FM1 and generates the frame image data for display FM2. The frame image data for display FM2 generated using the reference cutout region EPRs is referred to as standard image data FM2s as well. The standard image data FM2s generated instep S60 is transmitted to the PC 250 by the data transmitting section 648 (step S83).

If the condition determining section 644 determines that the motion does not satisfy the predetermined condition (NO in step S30), step S40 is executed. That is, the cutout section 643 shifts the center position of the cutout region from the reference cutout position Cs and generates the frame image data for display FM2 such that the movement of the camera 61 is not reflected on the frame image for display FM2 (step S40). The center position of the cutout region shifted from the reference cutout position Cs is referred to as post-correction cutout position Ct as well. A cutout region centering on the post-correction cutout position Ct is referred to as post-correction cutout region EPRt as well. The frame image data for display FM2 generated using the post-correction cutout region EPRt is referred to as corrected image data FM2t as well. In this embodiment, the center position of the cutout region on the frame image data FM1 is shifted from the reference cutout position Cs by an amount of an intra-frame movement in the frame image data FM1 corresponding to the movement of the camera 61 from reference time t0. The intra-frame movement may be calculated by comparing the frame image data FM1 at reference time t0 and the frame image data FM1 of a processing target. Alternatively, when the distance between the camera 61 and a target object of attention (e.g., the operation panel 78) is a known value, the intra-frame movement may be calculated on the basis of the movement of the camera 61. The corrected image data FM2t generated in step S40 is transmitted to the PC 250 by the data transmitting section 648 (step S82).

Figure 9:
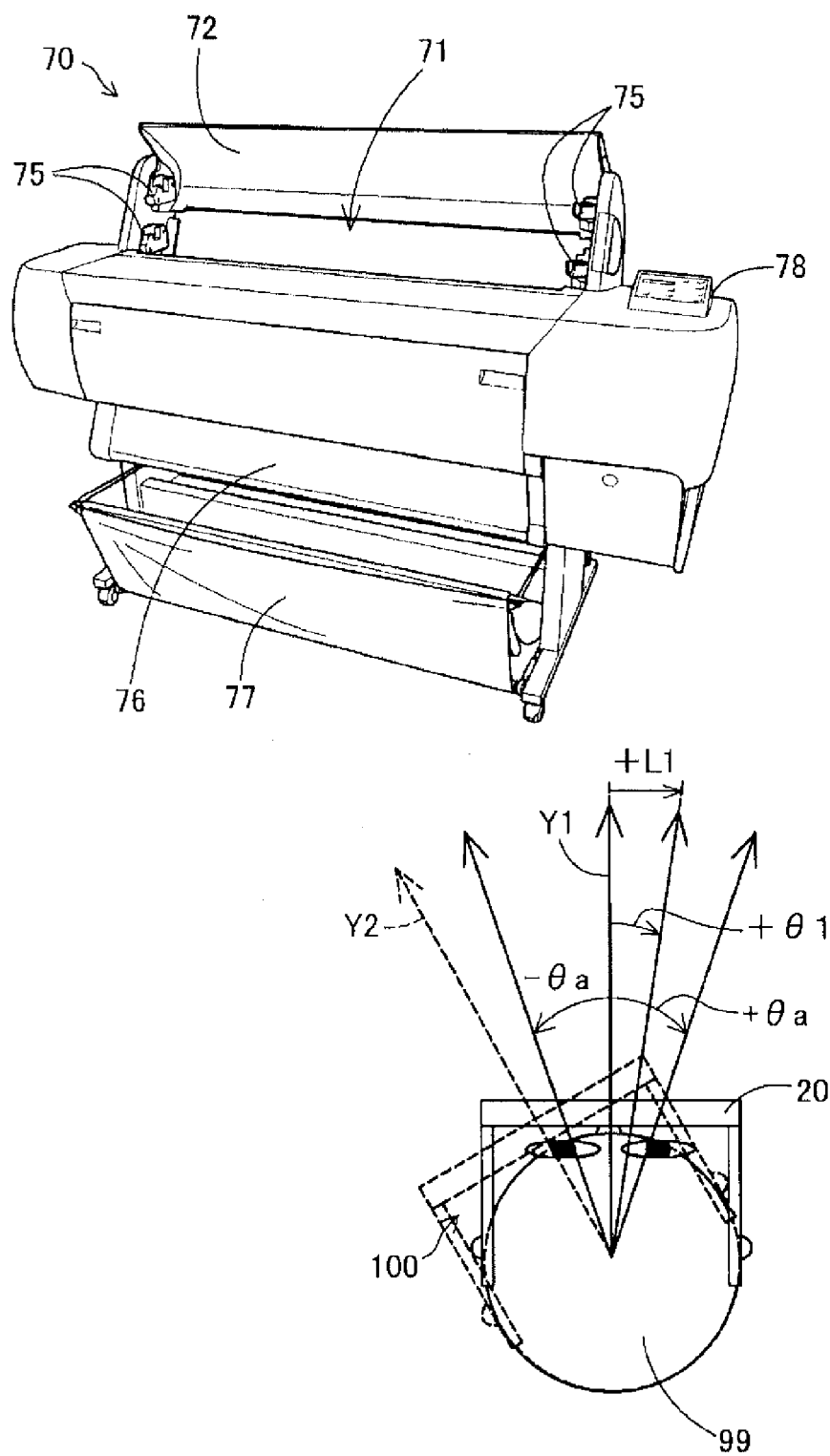
FIG. 9 is a diagram for explaining a processing flow.
Figure 10:
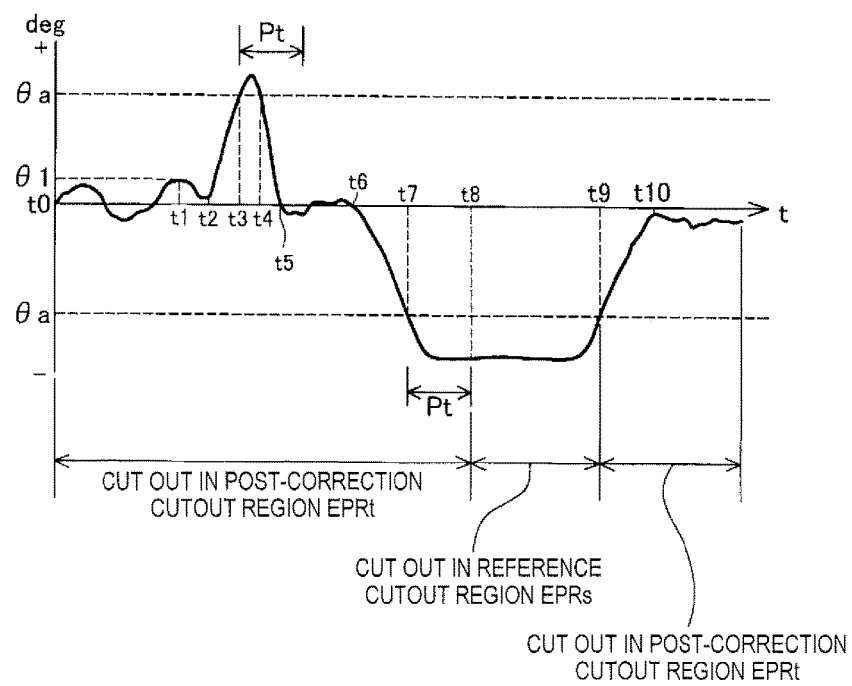
FIG. 10 is a diagram showing a change of a movement in a horizontal plane of a camera.
Figure 11:
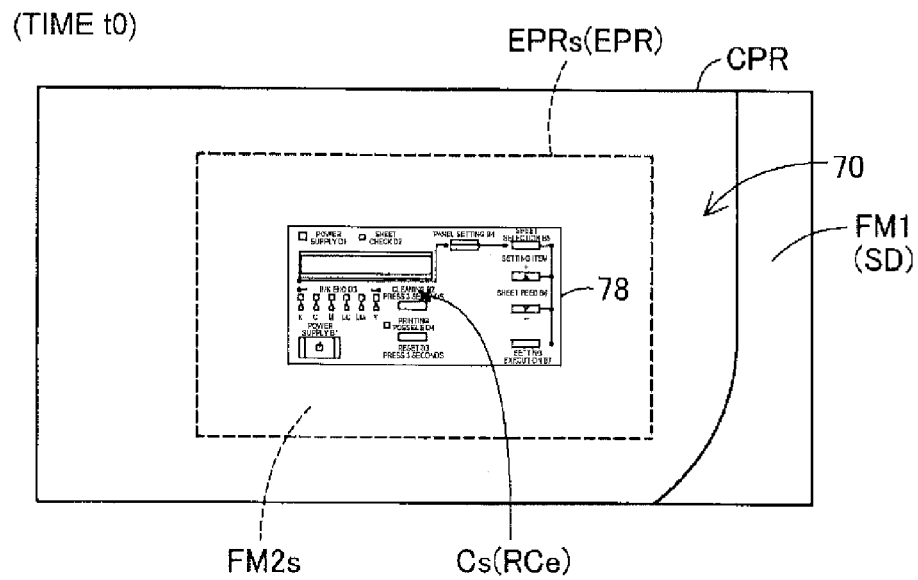
FIG. 11 is a diagram showing a relation between the image pickup region and the reference cutout region at reference time.
Figure 12:
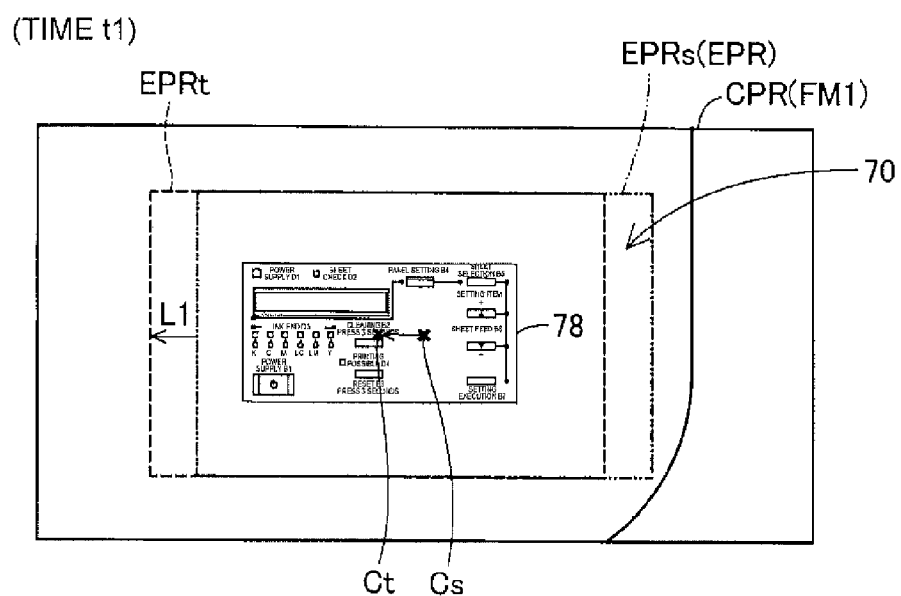
FIG. 12 is a diagram showing a relation between the image pickup region and the cutout region at time t1.
Figure 13:
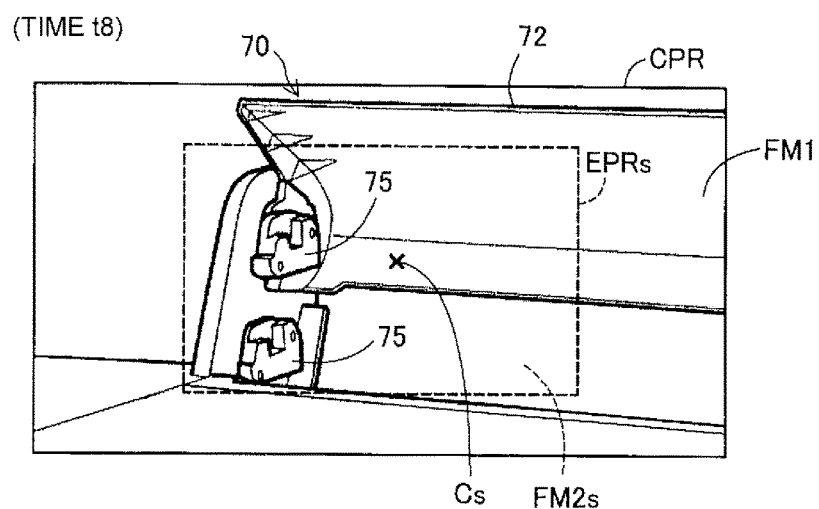
FIG. 13 is a diagram showing a relation between the image pickup region and the cutout region at time t8.

A-5. Specific Examples of the Reference Cutout Region EPRs and the Post-Correction Cutout Region EPRt FIG. 9 is a diagram for explaining a processing flow. FIG. 10 is a diagram showing a change of a movement in a horizontal plane of the camera 61. FIG. 11 is a diagram showing a relation between the image pickup region CPR and the reference cutout region EPRs at reference time t0. FIG. 12 is a diagram showing a relation between the image pickup region CPR and the cutout region EPR at time t1. FIG. 13 is a diagram showing a relation between the image pickup region CPR and the cutout region EPR at time t8.

After operating the operation panel 78 of the printer 70, a user 99 operates the spindle bearing 75 (FIG. 2) and thereafter further operates the operation panel 78. As shown in FIG. 9, when the user 99 operates the operation panel 78 of the printer 70, a visual line of the user 99 is directed to the vicinity of an arrow Y1. When operating the spindle bearing 75, the user 99 turns the head and the visual line is directed to the vicinity of an arrow Y2. In FIG. 10, in a period of time t0 to time t6, the user 99 operates the operation panel 78. In a period of time t7 to time t9, the user 99 operates the spindle bearing 75. Further, at time t10 and subsequent time, the user 99 operates the operation panel 78. In a period of time t8 to time t9, the movement of the camera 61 satisfies the predetermined condition. In a period of time t2 to time t5, responding to ambient sound (e.g., noise), after suddenly turning the head in order to view the direction of the sound, the user 99 changes the direction of the visual line to the direction of the operation panel 78 again.

As shown in FIG. 11, the processing start data SD is given to the frame image data FM1 at time t0. Therefore, the cutout-position setting section 641 sets, as the reference cutout position Cs, the center RCe of the image pickup region CPR represented by the frame image data FM1 (step S20 in FIG. 7). The detection information DT1 of the nine-axis sensor 66 at time t0 represents reference information for calculating the movement of the camera 61. That is, the condition determining section 644 determines whether the movement of the camera 61 at time t0 and subsequent time based on the position of the camera 61 at time t0 satisfies the predetermined condition.

As shown in FIG. 10, the camera 61 at time t2 further rotates and moves by $\theta 1$ clockwise than the camera 61 at reference time t0. $\theta 1$ is smaller than the predetermined threshold $\theta a$. The condition determining section 644 calculates on the basis of the detection information DT1 that the camera 61 has rotated and moved by $\theta 1$ clockwise and determines that the calculated movement amount $\theta 1$ of the camera 61 is smaller than the predetermined threshold $\theta a$. That is, the condition determining section 644 determines that the movement of the camera 61 at time t2 does not satisfy the predetermined condition (NO in step S30).

The cutout-position setting section 641 sets the post-correction cutout position Ct with respect to the frame image data FM1 at time t2. That is, as shown in FIG. 12, the cutout-position setting section 641 shifts the center position of the cutout region from the reference cutout position Cs in a direction opposite to the movement (+$\theta 1$) of the camera 61 to set the post-correction cutout position Ct. In this embodiment, the cutout-position setting section 641 shifts the cutout position from the reference cutout position Cs by an amount of a movement (−L1) opposite to the movement of the camera 61 in a frame image (the frame image represented by the frame image data FM1) to set the post-correction cutout position Ct. When the post-correction cutout position Ct is set, the post-correction cutout region EPRt in a fixed range centering on the post-correction cutout position Ct is set. The cutout section 643 cuts out, in the post-correction cutout region EPRt, the frame image represented by the frame image data FM1 and generates the corrected image data FM2t. The operation panel 78 is located in the center of the corrected image data FM2t such that the movement of the camera 61 is cancelled. Therefore, the frame image for display at time t2 is displayed on the display section 251 of the PC 250 like an image at the time when the camera 61 does not move from reference time t0. In a period of time t3 to time t4 when a movement amount of the camera 61 is equal to or larger than the predetermined value $\theta a$, since the condition of the predetermined time Pt is not satisfied, it is determined that the movement of the camera 61 does not satisfy the predetermined condition. In this case, like the data processing of the frame image data FM1 at time t2, the center position of the cutout region is shifted by the data processing section 646 by an amount corresponding to the movement of the camera 61. Note that, when a part of the post-correction cutout region EPRt is located outside the range of the image pickup region CPR, image data in a region located outside the region may be changed to black date or white data. The image data in the region located outside the region may be generated on the basis of image data of a region located within the range.

At time t8 in FIG. 10, the condition determining section 644 determines that the movement of the camera 61 satisfies the predetermined condition. In this case, as shown in FIG. 13, the cutout-position setting section 641 sets the reference cutout position Cs. The data processing section 646 generates the standard image data FM2s in the reference cutout region EPRs centering on the reference cutout position Cs. That is, a frame image for display at time t8 is an image reflecting the movement of the camera 61 from reference time t0. That is, an image including the spindle bearing 75 is displayed on the display section 251 of the PC 250 as a frame image for display.

As shown in FIG. 10, at time t9 and subsequent time, the movement of the camera 61 does not satisfy the predetermined condition. Therefore, the data processing section 646 generates the corrected image data FM2t using the post-correction cutout region EPRt.

As explained above, according to the first embodiment, it is possible to, while causing the display section 251 to display the moving image including the target object (e.g., the operation panel 78), a shake of the image displayed on the display section 251 due to the movement of the camera 61 not satisfying the predetermined condition. The predetermined condition includes the condition concerning the time, that is, the predetermined time. Consequently, even when the movement amount of the camera 61 is equal to or larger than the predetermined threshold, when the period of time in which the movement amount is equal to or larger than the predetermined threshold is shorter than the predetermined time, the center position Ce of the cutout region EPR is shifted from the reference cutout position Cs such that the movement of the camera 61 is reflected. Consequently, the movement of the camera 61 equal to or larger than the predetermined threshold that occurs in a period of time shorter than the predetermined time is not reflected on the image displayed on the display section 251. Therefore, it is possible to further reduce the shake of the image displayed on the display section 251. That is, even when the user suddenly moves the head, the sudden movement is not reflected on the image displayed on the display section 251.

According to the first embodiment, the cutout-position setting section 641 sets the reference cutout position Cs on the basis of the region of attention that should be paid attention. Consequently, it is possible to easily set the reference cutout position Cs on the basis of the region of attention. According to the first embodiment, the server 60 includes the data processing section 646 and the storing section 620. Consequently, it is unnecessary to implement the functions of the data processing section 646 and the storing section 620 in the HMD 100. Therefore, it is possible to reduce the costs of the HMD 100.

B. Second Embodiment

B-1. Configurations of an HMD and a Server

Figure 14:
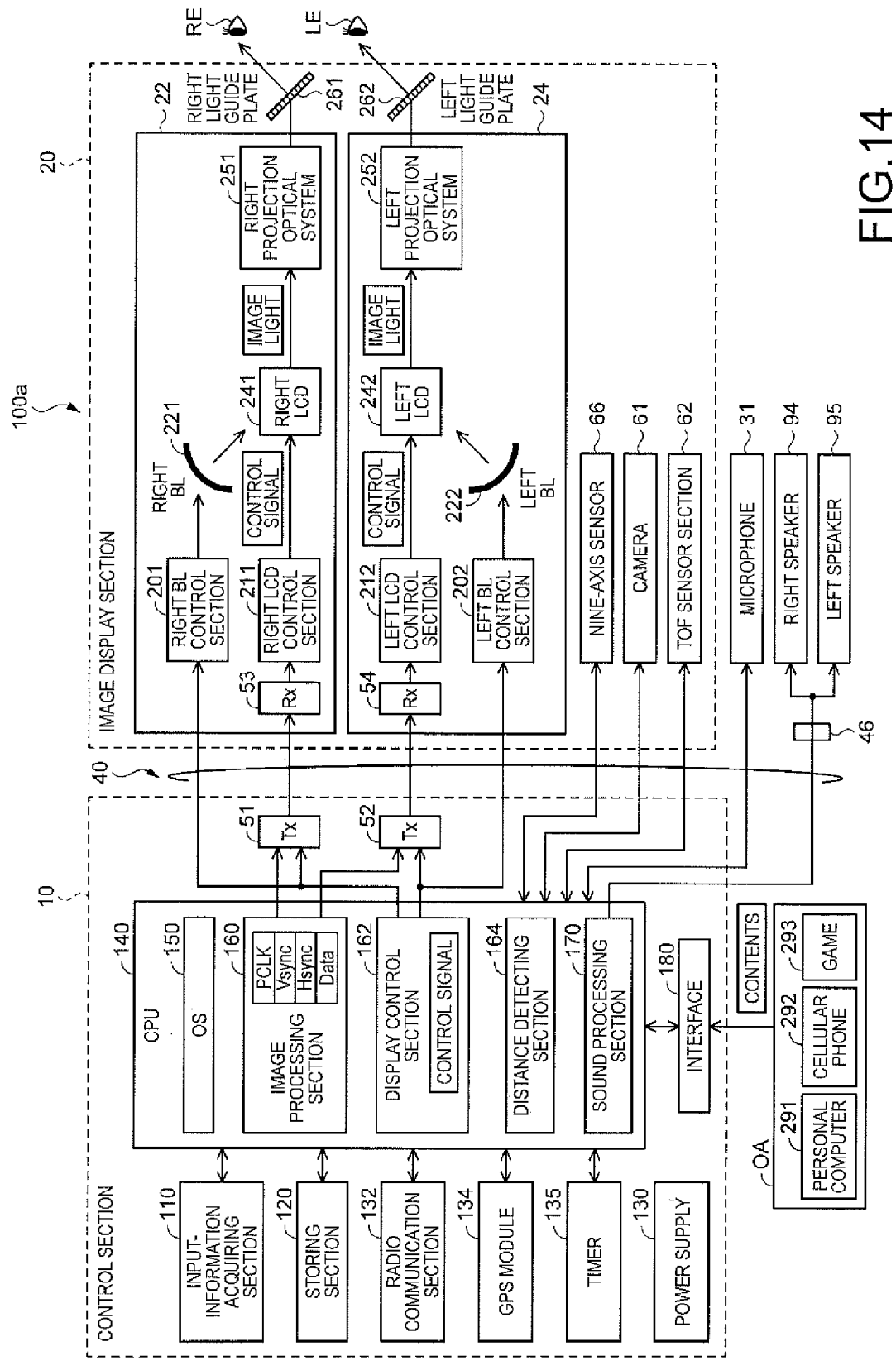
FIG. 14 is a block diagram functionally showing the configuration of an HMD in a second embodiment.

FIG. 14 is a block diagram functionally showing the configuration of an HMD 100a in a second embodiment. The HMD 100a in the second embodiment is different from the HMD 100 (FIG. 3) in the first embodiment in that the HMD 100a includes a TOF sensor section 62 and a distance detecting section 164 anew. The other components of the HMD 100a in the second embodiment are the same as the components of the HMD 100 in the first embodiment. Therefore, the same components are denoted by the reference numerals and signs same as those in the first embodiment and explanation of the components is omitted. The TOF sensor section 62 includes a light receiving element and an infrared LED.

The distance detecting section 164 is a distance image sensor that calculates, concerning reflected light of infrared ray detected by the TOF sensor section 62, using a TOF (Time of Flight) system, a time period from emission of the infrared ray from an infrared LED until reflection of the infrared ray on a specific target object and reception of the infrared ray by the light receiving element of the TOF sensor section 62 to detect a distance (a target object distance) from the image display section 20, in which the TOF sensor section 62 is disposed, to the specific target object.

Note that a configuration for detecting the distance is not limited to the configuration explained above. Various other methods explained below can be adopted.

First another distance detecting method: The distance detecting section 164 detects the target object distance on the basis of the position of the image display section 20 specified by the GPS module 134 and the position of the target object stored in the storing section 120 in advance.

Second another distance detecting method: When two cameras 61 are provided at an interval, the target object distance is detected using the trigonometry on the basis of the direction of the image display section 20 (the direction of the visual line of the user) detected by the nine-axis sensor 66 and two images including the target object picked up by the two cameras 61.

Third another distance detecting method: The distance detecting section 164 compares the actual size of the target object and the size of the target object in the frame image to detect the target object distance. In this case, data representing the actual size of the target object is stored in the storing section 120.

Distance data DL of the target object distance is given with time data representing the present time and stored in the storing section 120. The distance data DL is transmitted to a server 60a. Note that the distance data DL may be given to the frame image data FM generated at the same time.

Figure 15:
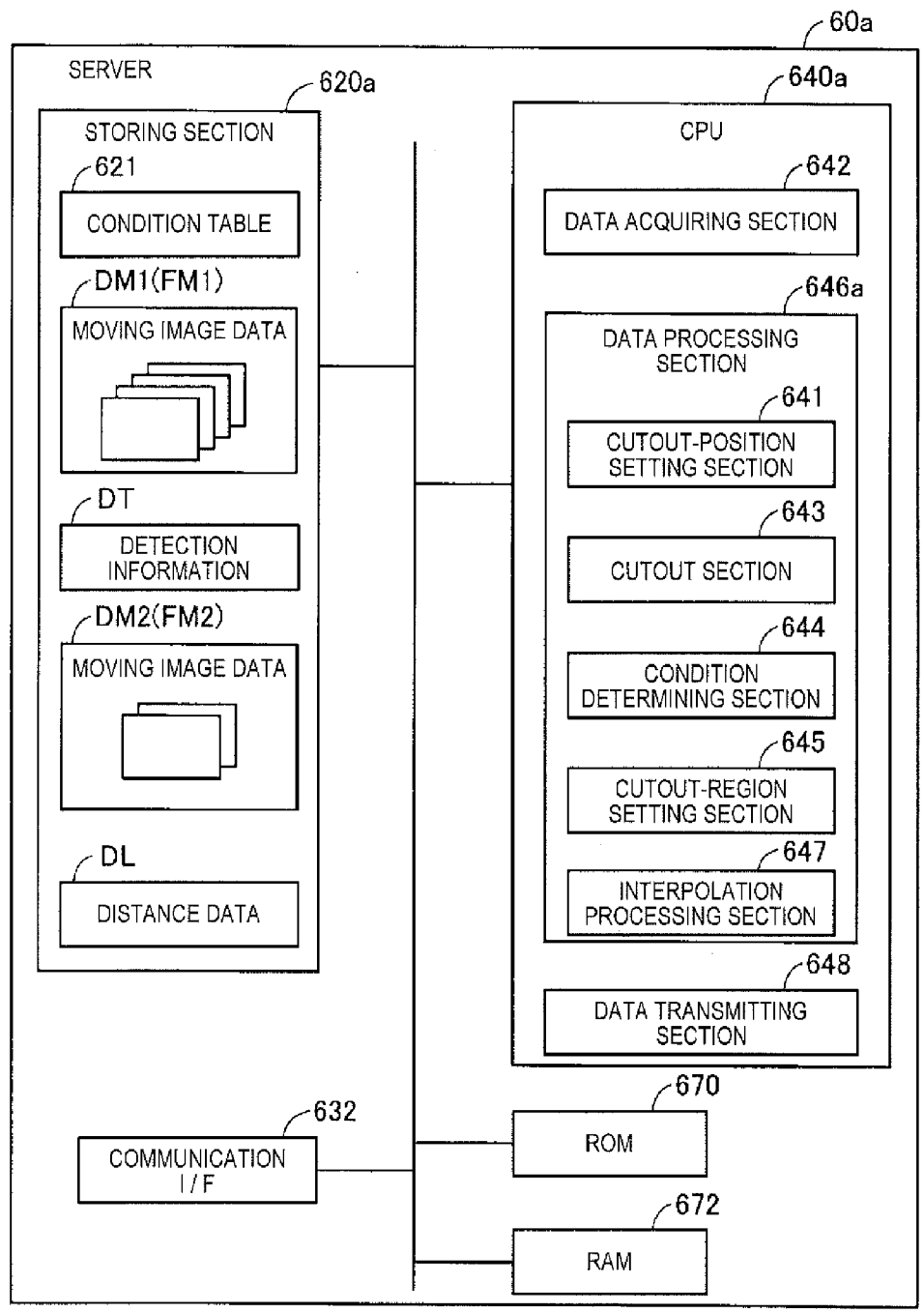
FIG. 15 is a block diagram functionally showing the configuration of a server in the second embodiment.

FIG. 15 is a block diagram functionally showing the configuration of a server 60a in the second embodiment. The server 60a in the second embodiment is different from the server 60 (FIG. 5) in the first embodiment in that the server 60a stores the distance data DL in a storing section 620a anew and a data processing section 646a includes an interpolation processing section 647 and a cutout-region setting section 645 anew. The other components of the server 60a in the second embodiment are the same as the components of the server 60 in the first embodiment. Therefore, the same components are denoted by reference numerals and signs same as those in the first embodiment and explanation of the components is omitted.

The interpolation processing section 647 executes processing for smoothing a movement of an entire moving image displayed on the display section 251. The interpolation processing section 647 generates a new frame image for display (frame image for interpolation display) inserted between two frame images for display represented by corrected image data FM2t generated when the movement of the camera 61 does not satisfy a predetermined condition and standard image data FM2s generated when the movement of the camera 61 satisfies the predetermined condition. Interpolation processing by the interpolation processing section 647 is executed between step S30 and step S60 shown in FIG. 7. Details of the interpolation processing section 647 are explained below.

The cutout-region setting section 645 changes the size of the cutout region EPR according to the distance data DL detected by the distance detecting section 164. In this embodiment, the cutout region EPR is set larger as the target object distance represented by the distance data DL is larger such that the size of the target object displayed on the display section 251 is substantially fixed. Note that the cutout region EPR may be increased in size stepwise as the target object distance increases in size. Details of the cutout-region setting section 645 are explained below.

B-2. Processing Content of the Interpolation Processing Section

Figure 16A:
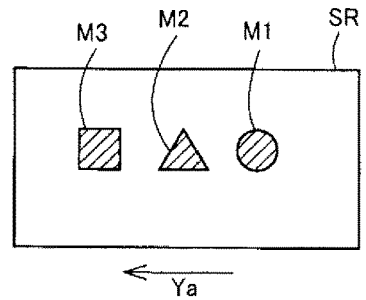
FIGS. 16A to 16C are diagrams for explaining an interpolation processing method executed by an interpolation processing section.
Figures 16B, 16C:
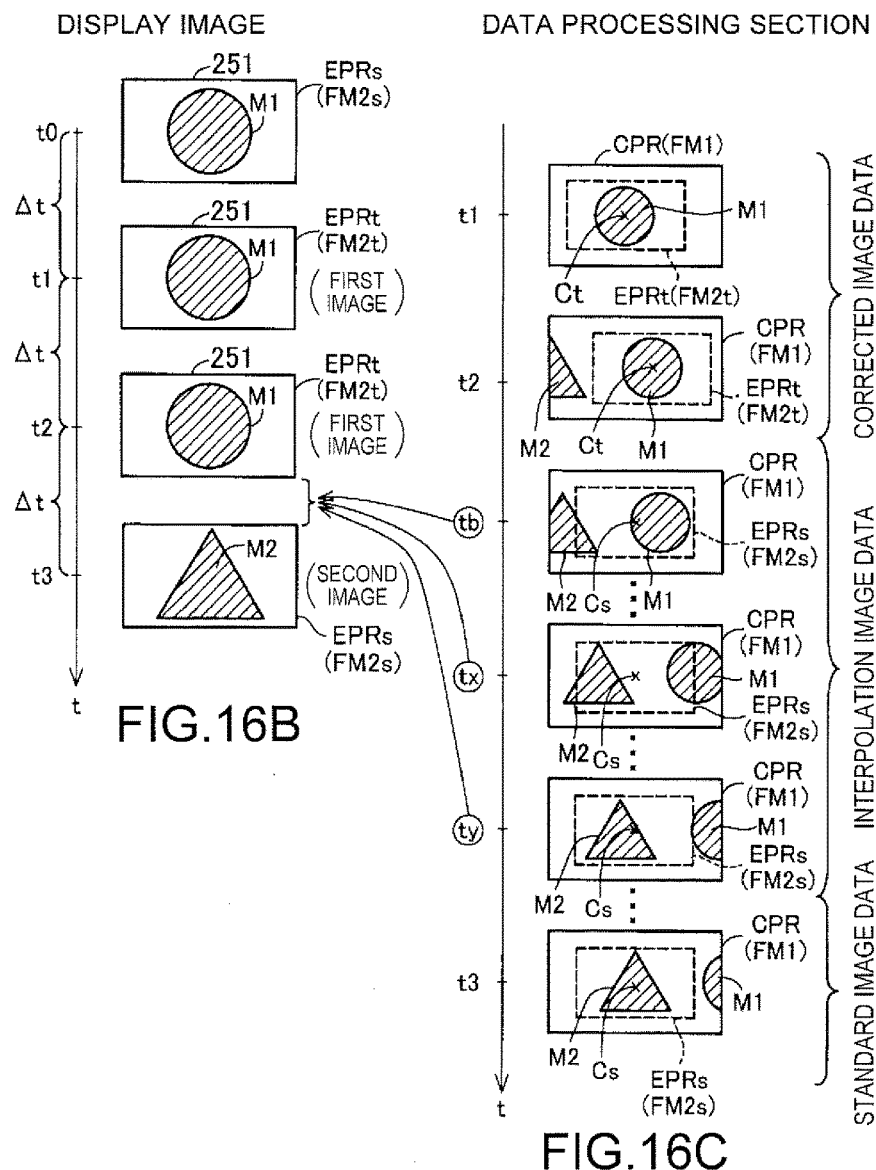

FIGS. 16A to 16C are diagrams for explaining an interpolation processing method executed by the interpolation processing section 647. FIG. 16A shows the outside world SC in the front of the user 99. FIG. 16B shows frame images displayed on the display section 251 of the PC 250 at respective times. FIG. 16C is a diagram for explaining processing contents of the data processing section 646a.

As shown in FIG. 16A, in the outside world SC, a first target object M1, a second target object M2, and a third target object M3 are disposed in order from the right. At reference time t0 to time t2, the user 99 performs work of the first target object M1. Subsequently, the user 99 moves from the right side to the left side as indicated by an arrow Ya. At time t3 and subsequent time, the user 99 performs work of the second target object M2. It is assumed that, at reference time t0 to time t2, the movement of the camera 61 does not satisfy the predetermined condition and, at time t3 and subsequent time, the movement of the camera 61 satisfies the predetermined condition. The data processing section 646 transmits the frame image data for display FM2 to the PC 250 at the second frame rate FR2 in order to cause the display section 251 to display a frame image at every predetermined interval Δt.

In a period of reference time t0 to time t2, the cutout section 643 generates the corrected image data FM2t from the frame image data FM1 using the post-correction cutout region EPRt. The corrected image data FM2t is transmitted to the PC 250 by the data transmitting section 648. The PC 250 displays a first image represented by the corrected image data FM2t. That is, a moving image in which the position of the first target object M1 does not change according to the movement of the camera 61 is displayed on the display section 251. As shown in FIG. 16B, an image in which the first target object M1 is the center of the display section 251 is displayed until time t2.

At time t3 and subsequent time, the cutout section 643 generates the standard image data FM2s from the frame image data FM1 using the reference cutout region EPRs. The standard image data FM2s is transmitted to the PC 250 by the data transmitting section 648. The PC 250 displays a second image represented by the standard image data FM2s. As shown in FIG. 16B, at time t3, an image in which the second target object M2 is the center of the display section 251 is displayed. That is, when the interpolation processing section 647 does not function, the second image at time t3 is suddenly displayed on the display section 251 following the first image at time t2. This causes the instructor on the display section 251 side to feel a sense of discomfort. Time t2 is a point in time when the movement of the camera 61 does not satisfy the predetermined condition. Time t3 is a point in time when the movement of the camera 61 satisfies the predetermined condition.

Therefore, the interpolation processing section 647 executes interpolation image processing as explained below. First, the interpolation processing section 647 selects at least one data out of frame image data for interpolation serving as the plurality of frame image data FM1 picked up in a period of time t2 to time t3 stored in the storing section 620a. In FIG. 16C, the interpolation processing section 647 selects the frame image data FM1 at time tg, time tm, and time ty. Subsequently, the interpolation processing section 647 cuts out, in the reference cutout region EPRs, a frame image of the selected frame image data FM1 and generates interpolation image data FM2m. The interpolation image data FM2m is stored in the storing section 620a. The interpolation image data FM2m is image data to be displayed on the display section 251. Therefore, the interpolation image data FM2m is referred to as "frame image data for interpolation display FM2m". The interpolation image data FM2m represents an image reflecting the movement of the camera 61.

The interpolation processing section 647 causes the storing section 620a to store the generated interpolation image data FM2m at time tg, time tm, and time ty in this order between first frame image data for display (the first image) and second frame image data for display (the second image) arranged in time series. That is, the interpolation processing section 647 inserts the interpolation image data FM2m between the corrected image data FM2t at time t2 and the standard image data FM2s at time t3 transmitted in time series at the second frame rate FR2 and causes the data transmitting section 648 to transmit these image data to the PC 250. That is, in the period of time t2 to time t3, an image reflecting the movement of the camera 61 is displayed on the display section 251 at a frame rate higher than the second frame rate FR2. Specifically, at time t2 to time t3, a fast-forwarding moving image, that is, a moving image in which an image is smoothly switched from the first target object M1 to the second target object M2 is displayed on the display section 251. Consequently, a movement of the image displayed on the display section 251 in the period of time t2 to time t3 is smoothed. It is possible to prevent the instructor viewing the display section 251 from feeling a sense of discomfort concerning the moving image. It is possible to generate the interpolation image data FM2m effectively using the frame image not used at the second frame rate FR2.

B-3. Another Processing Method of the Interpolation Processing Section

The interpolation processing method executed by the interpolation processing section 647 is not limited to the interpolation processing method explained above. The interpolation processing method may be another processing method as long as the interpolation image data FM2m for interpolating a difference between the first image and the second image can be generated when the second image represented by the second frame image data for display generated when the movement of the camera 61 satisfies the predetermined condition is displayed on the PC 250 after the first image represented by the first frame image data for display generated when the movement of the camera 61 does not satisfy the predetermined condition. A specific example of the other processing method executed by the interpolation processing section 647 is explained below.

Figure 17A:
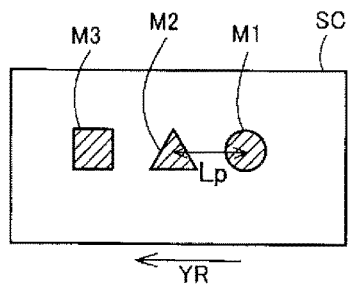
FIGS. 17A and 17B are diagrams for explaining another interpolation processing method executed by the interpolation processing section.
Figure 17B:
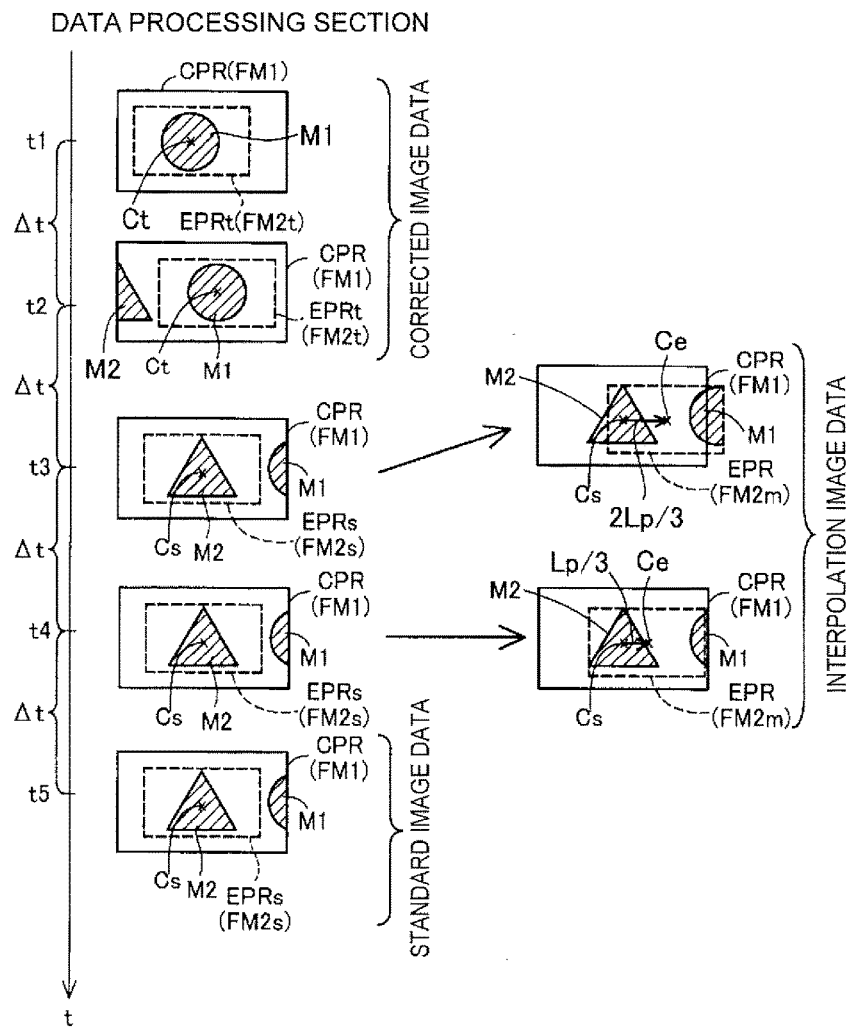

FIGS. 17A and 17B are diagrams for explaining another interpolation processing method executed by the interpolation processing section 647. FIG. 17A shows the outside world SC in the front of the user 99. FIG. 17B is a diagram for explaining processing contents of the data processing section 646a.

At reference time t0 to time t2, the user 99 performs work of the first target object M1. Subsequently, the user 99 moves from the right side to the left side by a distance L and, at time t3 and subsequent time, performs work of the second target object M2. A distance on the frame image data FM1 equivalent to the distance Lisa distance Lp. It is assumed that, at reference time t0 to time t2, the movement of the camera 61 does not satisfy the predetermined condition and, at time t3 and subsequent time, the movement of the camera 61 satisfies the predetermined condition. The data processing section 646a transmits the frame image data for display FM2 to the PC 250 at the second frame rate FR2 in order to cause the display section 251 to display the frame image at every predetermined interval Δt.

The interpolation processing section 647 performs, while maintaining the second frame rate FR2, interpolation of the frame image data FM1 in a boundary portion between a point in time when the movement of the camera 61 does not satisfy the predetermined condition and a point in time when the movement of the camera 61 satisfies the predetermined condition. The number of frames of the frame image on which the interpolation processing is executed by the interpolation processing section 647 may be set in advance or may be variable according to the movement amount of the camera 61. In this embodiment, the number of frames of the frame image on which the interpolation processing is executed is two. Note that, when the number of frames on which the interpolation processing is performed is varied according to the movement amount of the camera 61, it is desirable to increase the number of frames as the movement amount increases. Consequently, the movement of the image displayed on the display section 251 is further smoothed.

From time when the movement of the camera 61 satisfies the predetermined condition, the interpolation processing section 647 sets, with respect to the two frame image data FM1 at time t3 and time t4 arranged in time series, the center position Ce of the cutout region EPR to interpolate the movement of the camera 61. Specifically, the interpolation processing section 647 sets, with respect to the frame image data FM1 at time t3, as the center position Ce, a position shifted from the reference cutout position Cs by (2×Lp)/3 in a direction opposite to the movement of the camera 61. The interpolation processing section 647 cuts out the frame image data FM1 in the cutout region EPR centering on the set center position Ce and generates the interpolation image data FM2m. The interpolation processing section 647 sets, with respect to the frame image data FM1 at time t4, as the center position Ce, a position shifted from the reference cutout position Cs by (1×Lp)/3 in the direction opposite to the movement of the camera 61. The interpolation processing section 647 cuts out the frame image data FM1 in the cutout region EPR centering on the set center position Ce and generates the interpolation image data FM2*m*. Note that, in the interpolation image data FM2*m*, since the cutout region EPR is located outside the range of the image pickup region CPR as well, an outer side portion of the image pickup region CPR in the cutout region EPR is generated by predicting an image on the basis of the frame image before or after time t3.

In this way, the interpolation processing section 647 sets, with respect to the frame image data FM1, the center position Ce by shifting the center position Ce from the reference cutout position Cs by a distance (a shift amount) calculated by the following relational expression (1) in the direction opposite to the movement of the camera 61.

$$\text{Shift amount } Ls=(Nn \times Lp)/(Fn+1) \qquad (1)$$

In the relational expression (1), Nn represents order counted from the last of frames arranged in time series on which the interpolation processing is performed, Lp represents a distance on the frame image data FM1 equivalent to the movement amount L of the camera 61, and Fn represents the number of frames on which the interpolation processing is performed.

In this way, the interpolation processing section 647 sets, with respect to at least one frame image data FM located, in time series, between the frame image data FM1 serving as the first frame image data and the frame image data FM1 serving as the second frame image data, the center position Ce to interpolate the movement of the camera 61 and generates the interpolation image data FM2*m*. Consequently, the movement of the image displayed on the display section 251 in the period of time t2 to time t5 is smoothed. It is possible to prevent the instructor viewing the display section 251 from feeling a sense of discomfort concerning a moving image. It is possible to, while causing the display section 251 to display the moving image at the second frame rate FR2, prevent the instructor viewing a display section 25 from feeling a sense of discomfort concerning the moving image.

Note that the interpolation processing shown in FIGS. 17A and 17B may be executed on the frame image data FM1 in which it is determined that the movement of the camera 61 does not satisfy the predetermined condition. That is, the interpolation processing may be executed between step S30 and step S40 shown in FIG. 7. For example, in the following explanation, the interpolation processing is performed on the frame image data FM1 at time t1 and time t2, which is data in a boundary portion between a point in time when the movement of the camera 61 does not satisfy the predetermined condition and a point in time when the movement of the camera 61 satisfies the predetermined condition. In this case, with respect to the frame image data FM1 at time t2, a position shifted from the post-correction cutout position Ct by (2×Lp)/3 in a direction same as the movement of the camera 61 is set as the center position Ce. With respect to the frame image data FM1 at time t1, a position shifted from the post-correction cutout position Ct by (1×Lp)/3 in the direction same as the movement of the camera 61 is set as the center position Ce.

Figure 18A:
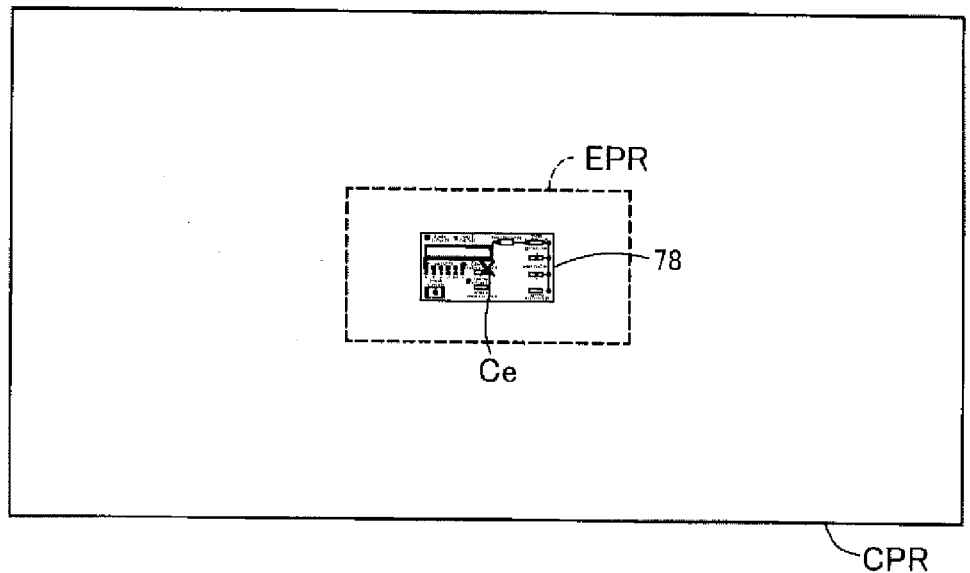
FIGS. 18A and 18B are diagrams for explaining processing contents of a cutout-region setting section.
Figure 18B:
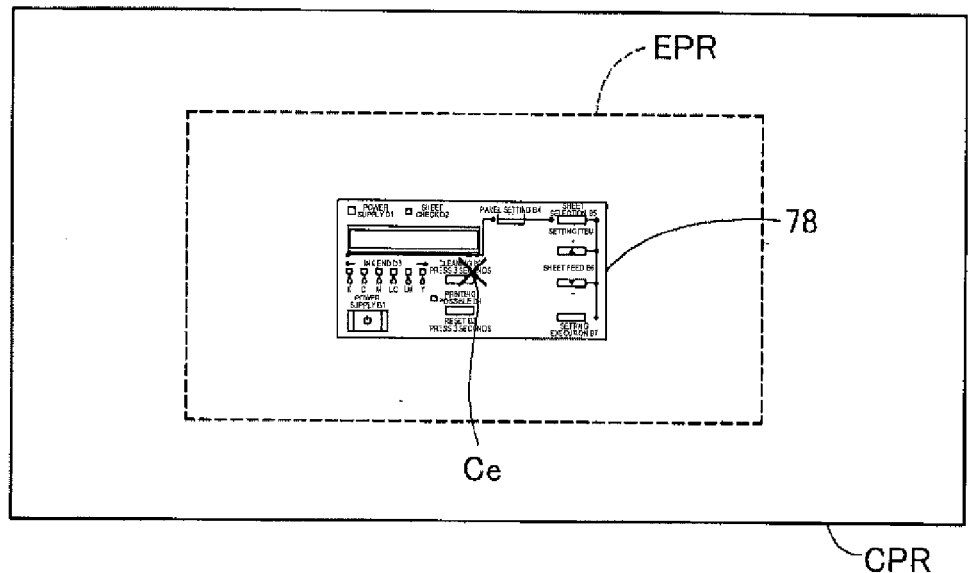

FIGS. 18A and 18B are diagrams for explaining processing contents of the cutout-region setting section 645. The target object distance represented by the distance data DL is larger in FIG. 18A than in FIG. 18B. In this case, the cutout-region setting section 645 sets the cutout region EPR centering on the center position Ce larger as the target object distance is larger. Consequently, it is possible to suppress the size of the target object (e.g., the operation panel 78) displayed on the display section 251 from greatly fluctuating.

According to the second embodiment, components same as the components in the first embodiment achieve the same effects. According to the second embodiment, since the server 60*a* includes the interpolation processing section 647, it is possible to suppress contents of the image displayed on the display section 251 from being suddenly switched in the boundary portion between the point in time when the predetermined condition is not satisfied and the point in time when the predetermined condition is satisfied.

C. Modification of the Cutout-Position Setting Section

In the first and second embodiments, the cutout-position setting section 641 (FIGS. 5 and 15) sets, as the reference cutout position Cs, the center RCe of the image pickup region CPR represented by the frame image data FM1. However, a method of setting the reference cutout position Cs is not limited to this. For example, the reference cutout position Cs may be set by any one of first to third other setting methods explained below.

Figure 19:
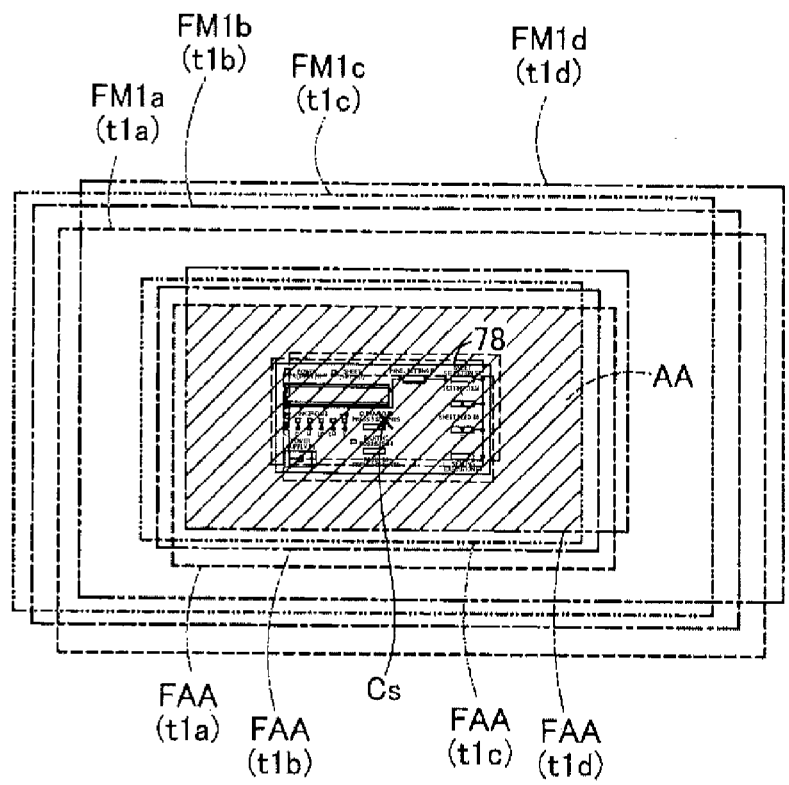
FIG. 19 is a diagram for explaining first another setting method for a reference cutout position.

FIG. 19 is a diagram for explaining the first other setting method for the reference cutout position Cs. The cutout-position setting section 641 determines, as a region of attention AA, overlapping image regions among candidate regions of attention FAA in a plurality of frame images FM1*a* to FM1*d* picked up in a predetermined period (time t1*a* to time t1*d*: e.g., 1 to 10 seconds) after the data processing start mark SM is selected. The cutout-position setting section 641 sets the center position of the determined region of attention AA as the reference cutout position Cs. The candidate regions of attention FAA are fixed regions smaller than the frame images FM1*a* to FM1*d* centering on a center position Rce of the frame images FM1*a* to FM1*d*. The cutout-position setting section 641 discriminates, with image processing, an image of the region of attention AA present in the candidate region of attention FAA of the frame image FM1*a* at certain time (e.g., time t1*a*). The cutout-position setting section 641 sets, as a reference cutout position, the center position of the region of attention AA in the frame image FM1*a*. In this way, according to the first other setting method, it is possible to easily set the region of attention AA on the basis of overlapping data without depending on operation by the user or the instructor.

The first other setting method is not limited to the method explained above. The reference cutout position Cs may be determined as the region of attention AA on the basis of a direction of the visual line or an opening/closing state of the pupils of the user of the HMD 10. For example, a sensor or a camera that detects the direction of the visual line or the state of the pupils of the user is provided in the HMD 100 anew. As a method of determining the region of attention AA on the basis of the direction of the visual line, for example, when the HMD 100 determines that the direction of the visual line of the user in within a fixed region for a predetermined time, the fixed region may be determined as the region of attention AA. As a method of setting the region of attention AA on the basis of the opening/closing state of the pupils, for example, the opening/closing state of the pupils is detected by the sensor or the camera and a fixed region to which the user pays attention is estimated on the basis of a detection result. The estimated fixed region is determined as the region of attention AA.

Figure 20:
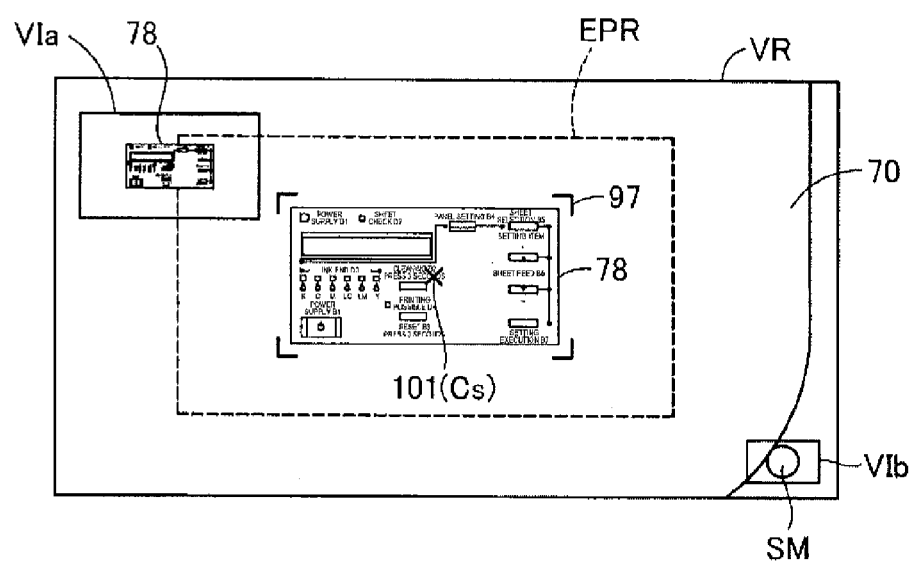
FIG. 20 is a diagram for explaining second another setting method for the reference cutout position.

FIG. 20 is a diagram for explaining the second other setting method for the reference cutout position Cs. The cutout-position setting section 641 sets a cutout center position by determining, as a region of attention, a region including a designated target object designated from the outside (e.g., the instructor). For example, the instructor of the PC 250 causes the user of the HMD 100 to designate a target object that the user should pay attention (a designated target object) and causes the image display section 20 to display the designated target object as the image VIa. In FIG. 20, an image of the display 79 is displayed on the image display section 20. The user moves a frame-like image 97, which represents the region of attention displayed on the image display section 20, using the cross key 16 (FIG. 1) such that the display 79 present in an outside scene is located within the frame image 97. The frame image 97 includes a mark 101 indicating the center position of the frame image 97. After locating the operation panel 78 including the display 79 within the frame image 97, the user selects the data processing start mark SM displayed as an image. Consequently, the center of the frame image 97 is set in the reference cutout position Cs. In this way, according to the second other setting method, the region including the designated target object designated from the outside can be set as the region of attention. Since the image of the designated target object is displayed on the image display section 20, the user can easily recognize the designated target object by visually recognizing the image displayed on the image display section 20.

In the second other setting method, the region of attention is set by designating the designated target object using the frame image 97. However, a method of setting the region of attention is not limited to this. Another method capable of designating the designated target object may be adopted instead of the method of designating the designated target object using the frame image 97. For example, a colored image (a color image) through which the outside scene can be transmitted is displayed on the image display section 20. The color image is moved such that the operation panel 78 serving as the designated target object is located within the color image. The center of the color image is set in the reference cutout position Cs by selecting the data processing start mark SM. As the exterior shape of the color image, various shapes such as a rectangular shape and a circular shape can be adopted.

Figures 21A, 21B:
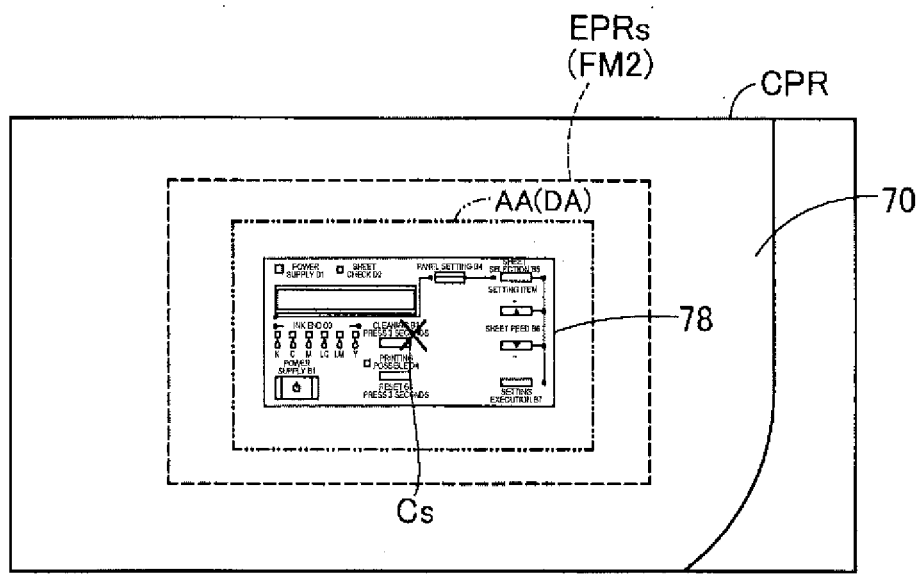
FIGS. 21A and 21B are diagrams for explaining third another setting method for the reference cutout position.

FIGS. 21A and 21B are diagrams for explaining the third other setting method for the reference cutout position Cs. FIG. 21A is a diagram for explaining an object-of-attention table 122. FIG. 21B is a diagram for explaining a setting method for the reference cutout position Cs.

As shown in FIG. 21A, the storing section 120 of the HMD 100 includes anew the object-of-attention table 122 that stores an object of attention. The object-of-attention table 122 includes, for each target object of attention, characteristic information for specifying the target object of attention. The characteristic information is information such as the shape, the size, and the color of the target object of attention. In the object-of-attention table 122 shown in FIG. 21A, the characteristic information is stored for each of the sections (e.g., the display 79) of the printer 70.

The cutout-position setting section 641 detects, with pattern matching, one target object of attention stored in the object-of-attention table 122 out of the frame image data FM. Then, the cutout-position setting section 641 determines, as the region of attention AA, a region including the detected target object of attention. The cutout-position setting section 641 sets the center position of the region of attention AA as the reference cutout position Cs. For example, as shown in FIG. 21B, the cutout-position setting section 641 detects the operation panel 78 out of the frame image data FM. The cutout-position setting section 641 sets, as the reference cutout position Cs, the center position of the region of attention AA including the operation panel 78. The setting of the reference cutout position Cs is recognized as reception of the processing start data SD. The processing in step S20 (FIG. 7) and subsequent steps is executed by the servers 60 and 60a. Note that a detection region DA of the frame image data FM1 for detecting the target object of attention is desirably a region smaller than the image pickup region CPR and a region including the center position of the image pickup region CPR. Consequently, it is possible to prevent the target object of attention from being detected when the target object of attention is located at an end of the image pickup region CPR. Therefore, it is possible to prevent the reference cutout position Cs from being set near the end of the image pickup region CPR. According to the third other setting method, it is possible to set the reference cutout position Cs by automatically detecting the target object of attention with the cutout-position setting section 641.

D. Modifications

In the embodiments, a part of the components implemented by hardware may be replaced with software. Conversely, a part of the components implemented by software may be replaced with hardware. Besides, modifications explained below are also possible.

Modification 1

In the first and second embodiments, the data processing elements (the storing sections 620 and 620a and the data processing sections 646 and 646a) for generating the frame image data for display FM2 are provided in the servers 60 and 60a that relay data between the HMD 100 and the PC 250. However, the data processing elements are not limited to this. For example, the storing sections 620 and 620a and the data processing sections 646 and 646a may be provided in the HMD 100 or may be provided in the PC 250. Consequently, it is possible to perform data processing for moving image data using a single device (e.g., the HMD 100).

The information processing device including the data processing elements (the data processing sections 646 and 646a and the storing sections 620 and 620a) for generating the frame image data for display FM2 may be connected to at least one of the HMD 100 and the display section 251 (FIG. 1) by a wired cable. One of the HMD 100 and the PC 250 may include the data processing elements. The HMD 100 and the PC 250 may be connected by a wired cable.

Modification 2

In the embodiments, the HMD 100 is used as an example of the image display device. However, the image display device is not limited to this. The image display device only has to include at least an image pickup section that picks up a moving image and a sensor for detecting a movement of the image pickup section. The image display device may be, for example, a video camera, a smartphone, a tablet terminal, or a robot. The image display device does not have to have a function of displaying an image. In this case, the image display device can be called moving-image acquiring device as well. The display system 1 is explained using the remote support system as an example. However, the display system 1 is not limited to this. For example, the invention may be applied to, for example, a system that performs a live broadcast of baseball games. The configurations of the HMD 100, the servers 60 and 60a, and the PC 250 can be optionally decided without departing from the spirit of the invention. For example, addition, deletion, conversion, and the like of the components can be performed.

In the embodiments, the HMD 100 is the transmission-type HMD of the binocular type. However, the HMD 100 may be an HMD of a monocular type. The HMD 100 may be configured as a non-transmission-type HMD with which transmission of an outside scene is blocked in a state in which the user wears the HMD. The HMD 100 may be configured as a video see-through HMD obtained by mounting a camera on the non-transmission-type HMD. For example, the right optical-image display section 26 and the left optical-image display section 28 (FIG. 1) included in the image display section 20 may be formed smaller than in the embodiments and respectively disposed, for example, obliquely above and obliquely below the left and right eyes of the user during the wearing of the HMD. In this way, the optical-image display sections only have to be disposed near the eyes of the user. The size of the optical members forming the optical-image display sections may be any size. The optical-image display sections may cover only a part of the eyes of the user. In other words, the optical-image display sections do not have to completely cover the eyes of the user. An HMD of a pupil division type may be adopted as the invention. In the HMD of the pupil division type, light from the outside world present ahead of the optical-image display sections enters the pupils from portions that do not cover the optical-image display sections. For example, as the image display section, instead of the image display section worn like eyeglasses, a normal flat display device (a liquid crystal display device, a plasma display device, an organic EL display device, etc.) may be adopted. In this case, as in the embodiments, the control section and the image display section may be connected via a wired signal transmission line or may be connected via a wireless signal transmission line. Consequently, the control section can also be used as a remote controller of the normal flat display device. For example, as the image display section, an image display section of another shape such as an image display section worn like a cap may be adopted instead of the image display section worn like eyeglasses. As earphones, an ear hook type or a headband type may be adopted. The earphones may be omitted. For example, the image display section may be configured as a head-up display (HUD) mounted on vehicles such as an automobile and an airplane and other transportation means. For example, the image display section may be configured as an HMD incorporated in body protective equipment such as a helmet. For example, the image display section may be configured as a portable hand held display.

Modification 3

In the first and second embodiments, the cutout-position setting section 641 sets the post-correction cutout position Ct on the basis of the detection information DT1 of the nine-axis sensor 66. However, the setting of the post-correction cutout position Ct is not limited to this. For example, the cutout-position setting section 641 may set the post-correction cutout position Ct on the basis of a stationary movement of the camera 61 (i.e., a stationary shake of the head of the user of the HMD 100) measured in advance.

Modification 4

In the first and second embodiments, the center RCe of the image pickup region CPR is set as the reference cutout position Cs. However, the reference cutout position Cs is not limited to this. For example, the reference cutout position Cs may be designated by the user or the instructor or may be set in a position shifted from the center RCe of the image pickup region CPR.

Modification 5

In the second embodiment, the distance detecting section 164 sets the cutout region EPR larger as the target object distance represented by the distance data DL is larger. However, the cutout region EPR is not limited to this. For example, the distance detecting section 164 may set the cutout region EPR smaller as the target object distance represented by the distance data DL is larger.

Instead of the distance between the camera 61 and the predetermined target object (the target object distance), the size of the cutout region EPR may be changed according to moving speed of the head of the user of the HMD 100. The moving speed of the head is detected by the nine-axis sensor 66 or calculated by the CPU 140 on the basis of a detection result of the nine-axis sensor 66. For example, the cutout region may be set larger as the moving speed is higher. Consequently, since a region in a wide range can be displayed on the display section 251, the instructor can more easily recognize the movement of the head.

Modification 6

In the first and second embodiments, the cutout-position setting section 641 sets the post-correction cutout position Ct by shifting the reference cutout position Cs by the movement amount from the reference position of the camera 61 in the frame image in the direction opposite to the movement of the camera 61. However, a setting method for the post-correction cutout position Ct is not limited to this. For example, the cutout-position setting section 641 may set the post-correction cutout position Ct to make it possible to suppress the movement of the camera 61 from being reflected on the display section 251. Specifically, the cutout-position setting section 641 may set the post-correction cutout position Ct by shifting the reference cutout position Cs by a distance smaller than the movement amount (e.g., ⅓ or ⅔ of the movement amount) from the reference position of the camera 61 in the direction opposite to the movement of the camera 61.

Modification 7

When the display device is an HMD of a binocular type or is capable of three dimensionally displaying an image, the display device may stereoscopically display the image as explained below. Specifically, the display device may detect, with the distance detecting section 164, the distance from the predetermined target object to the image pickup section, generate respective frame images visually recognized by the left and right eyes of the instructor with a parallax corresponding to a detection result added to the frame images, and stereoscopically display the image.

Modification 8

In the embodiments, the camera 61 of the HMD 100 transmits the plurality of frame image data FM1 continuing in time series to the servers 60 and 60a as the moving image data DM1. The data processing sections 646 and 646a of the servers 60 and 60a perform the data processing on the moving image data DM1. However, the camera 61 of the HMD 100 and the data processing sections 646 and 646a are not limited to this. For example, the camera 61 of the HMD 100 may pick up images in every predetermined period and transmit a picked-up plurality of images to the servers 60 and 60a. The data processing sections 646 and 646a of the servers 60 and 60a may perform the data processing on a plurality of image data.

Modification 9

The invention is not limited to the embodiments, the examples, and the modifications explained above and can be implemented as various configurations without departing from the spirit of the invention. For example, the technical features in the embodiments, the examples, and the modifications corresponding to the technical features in the aspects described in the summary can be replaced or combined as appropriate in order to solve a part or all of the problems or attain a part or all of the effects. Unless the technical features are explained in this specification as essential technical features, the technical features can be deleted as appropriate.

The entire disclosure of Japanese Patent Application No. 2015-153170, filed Aug. 3, 2015 is expressly incorporated by reference herein.

What is claimed is:

1. A display system for use with a user, the display system comprising:
a camera configured to record an image;
a sensor configured to detect a movement of the camera; and a processor programmed to:
cut out a predetermined cutout region of the image and generate image data to be displayed, including:
setting a reference cutout position for specifying a position of the cutout region based on a region of attention that is determined based on a direction of a visual line or an opening/closing state of at least one pupil of the user,
when the detected movement of the camera satisfies a predetermined condition: (i) setting a specified position in the reference cutout position for cutting out the image, (ii) cutting out the cutout region of the image at the specified position, and (iii) generating the image data,
when the detected movement does not satisfy the predetermined condition: (1) shifting the specified position from the reference cutout position in a direction opposite to the movement of the camera from a reference position, and (2) generating the image data; and
when a second image represented by a second version of image data for display generated when the predetermined condition is satisfied is displayed on the display device after a first image represented by a first version of the image data for display generated when the predetermined condition is not satisfied, (a) generating image data for interpolation display for interpolating a difference between the first image and the second image, and (b) inserting the image data for interpolation display between the first and second versions of image data for display arranged in time series,
curtailing a plurality of images picked up by the camera and generated at a first frame rate and transmitting the image data for display at a second frame rate lower than the first frame rate,
selecting image data for interpolation serving as the image data located between image data serving as a base of the first version of image data for display and image data serving as a base of the second version of image data for display and scheduled to be curtailed at the second frame rate,
cutting out an image represented by the image data for interpolation in the cutout region centering on the reference cutout position, and
generating the image data for interpolation display; and
transmit the generated image data to a display that displays the generated image data.

2. The display system according to claim 1, wherein the predetermined condition is a condition in which a moving amount of the camera from the reference position is continuously equal to or larger than a predetermined threshold at a predetermined time or more.

3. The display system according to claim 1, wherein the processor sets, with respect to image data serving as a base of at least a singularity of the image data for display located, in time series, between a first version of the image data serving as a base of the first version of image data for display and a second version of image data serving as a base of the second version of image data for display, the specified position to interpolate the movement of the camera from the generation of the first version of image data to the generation of the second version of image data and generates the image data for interpolation display.

4. The display system according to claim 1, further comprising:
a distance detecting sensor configured to detect a distance between the camera and a predetermined target object included in the image, wherein
the processor is further programmed to:
change a size of the cutout region according to the distance detected by the distance detecting section.

5. The display system according to claim 4, wherein the processor sets the cutout region larger as the distance is larger.

6. The display system according to claim 4, wherein the distance detecting sensor detects the distance by comparing an actual size of the predetermined target object and a size of the predetermined target object in the image.

7. The display system according to claim 1, wherein same identification information is given to each of image data representing the image and detection information of the sensor at time when the image data is generated.

8. The display system according to claim 1, further comprising
an information processing device configured to acquire the image recorded by the camera, wherein
the processor is provided in the information processing device.

9. The display system according to claim 1, further comprising
an image display device including a display configured to display a virtual image and capable of transmitting an image of an outside world, wherein
the processor is provided in the image display device.

10. The display system according to claim 1, further comprising
a display device configured to display an image for display represented by the image data for display, wherein
the processor is provided in the display device.

11. A display system for use with a user, the display system comprising:
a camera configured to record an image;
a sensor configured to detect a movement of the camera; and
a processor configured to:
cut out a predetermined cutout region of the image and generate image data for display, including:
when the movement of the camera detected by the sensor satisfies a predetermined condition: (i) set a specified position in the reference cutout position, (ii) cutting out the image based on the specified position, and (iii) generate the image data for display, and
when the movement does not satisfy the predetermined condition, shift the specified position from the reference cutout position in a direction opposite to the movement of the camera from a reference position and generate the image data for display; and transmit the image data for display to a display device, wherein:

when a second image represented by a second version of image data for display generated when the predetermined condition is satisfied is displayed on the display device after a first image represented by a first version of the image data for display generated when the predetermined condition is not satisfied, generate image data for interpolation display for interpolating a difference between the first image and the second image, and insert the image data for interpolation display between the first and second versions of image data for display arranged in time series.

12. A display system for use with a user, the display system comprising:

a camera configured to record an image;

a sensor configured to detect a movement of the camera;

a distance sensor configured to detect a distance between the camera and a predetermined target object included in the image; and a processor configured to:

change a size of a predetermined cutout region of the image according to the distance detected by the distance sensor, cut out the cutout region and generate image data for display, including:

when the movement of the camera detected by the sensor satisfies a predetermined condition: (i) set a specified position in the reference cutout position, (ii) cutting out the image based on the specified position, and (iii) generate the image data for display, and when the movement does not satisfy the predetermined condition, shift the specified position from the reference cutout position in a direction opposite to the movement of the camera from a reference position and generate the image data for display; and transmit the image data for display to a display device.

\* \* \* \* \*